(12) United States Patent
Kapczynski et al.

(10) Patent No.: US 8,972,400 B1
(45) Date of Patent: Mar. 3, 2015

(54) PROFILE DATA MANAGEMENT

(71) Applicant: ConsumerInfo.com, Inc., Costa Mesa, CA (US)

(72) Inventors: Mark Joseph Kapczynski, Santa Monica, CA (US); Michael John Dean, Torrance, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 131 days.

(21) Appl. No.: 13/794,459

(22) Filed: Mar. 11, 2013

(51) Int. Cl.
*G06F 17/30* (2006.01)
*G06F 3/06* (2006.01)

(52) U.S. Cl.
CPC .... *G06F 17/30129* (2013.01); *G06F 17/30011* (2013.01); *G06F 17/30091* (2013.01); *G06F 3/0643* (2013.01); *G06F 17/30867* (2013.01); *G06F 17/30035* (2013.01); *G06F 17/30702* (2013.01); *G06F 17/30029* (2013.01)
USPC ........... 707/732; 707/733; 707/734; 707/722; 707/821

(58) Field of Classification Search
CPC ................... G06F 17/30129; G06F 17/30011; G06F 17/30091; G06F 3/0643; G06F 17/30867; G06F 17/30029; G06F 17/30035; G06F 17/30702
USPC .................................. 707/722, 732–734, 821
See application file for complete search history.

(56) References Cited

U.S. PATENT DOCUMENTS

| 5,590,038 A | 12/1996 | Pitroda |
| 5,640,577 A | 6/1997 | Scharmer |
| 5,659,731 A | 8/1997 | Gustafson |

(Continued)

FOREIGN PATENT DOCUMENTS

| JP | 10-222559 | 8/1998 |
| JP | 10-261009 | 9/1998 |

(Continued)

OTHER PUBLICATIONS

U.S. Appl. No. 12/705,489, filed Feb. 12, 2010, Bargoli et al.

(Continued)

*Primary Examiner* — Frantz Coby
(74) *Attorney, Agent, or Firm* — Knobbe, Martens, Olson & Bear, LLP

(57) ABSTRACT

In an embodiment, a profile data management system provides a central repository for data and information associated with a user. The information may be presented through an electronic user interface as a profile of the user. In an embodiment, the profile data management system maintains profiles for many users and enables users and/or secondary users to submit information and to modify the user profiles. Modifications are made to user profiles when the submitted information is sufficiently reliable. In general, the method of building and modifying profiles in the profile data management system based on the contributions of many users may be referred to as crowdsourcing profiles. Crowdsourcing profiles may advantageously enable the generation and verification of large amounts of data related to many individuals. The crowdsourcing profiles model allows secondary users to provide updates, modifications, comments, ratings, preferences, and/or other inputs to the profile data management system. Crowdsourcing profiles may advantageously reduce redundant profile management efforts by generating and/or updating profile data based on data that is reported as reliable by one or more users.

19 Claims, 12 Drawing Sheets

(56) References Cited

U.S. PATENT DOCUMENTS

| | | | |
|---|---|---|---|
| 5,692,107 A | 11/1997 | Simoudis et al. |
| 5,822,751 A | 10/1998 | Gray et al. |
| 5,825,884 A | 10/1998 | Zdepski et al. |
| 5,832,068 A | 11/1998 | Smith |
| 5,844,218 A | 12/1998 | Kawan et al. |
| 5,881,131 A | 3/1999 | Farris et al. |
| 5,956,693 A | 9/1999 | Geerlings |
| 6,038,551 A | 3/2000 | Barlow et al. |
| 6,070,147 A | 5/2000 | Harms et al. |
| 6,073,140 A | 6/2000 | Morgan et al. |
| 6,128,602 A | 10/2000 | Northington et al. |
| 6,157,927 A | 12/2000 | Schaefer et al. |
| 6,254,000 B1 | 7/2001 | Degen et al. |
| 6,405,173 B1 | 6/2002 | Honarvar |
| 6,446,200 B1 | 9/2002 | Ball et al. |
| 6,457,012 B1 | 9/2002 | Jatkowski |
| 6,523,022 B1 | 2/2003 | Hobbs |
| 6,523,041 B1 | 2/2003 | Morgan et al. |
| 6,748,426 B1 | 6/2004 | Shaffer et al. |
| 6,766,327 B2 | 7/2004 | Morgan, Jr. et al. |
| 6,804,346 B1 | 10/2004 | Mewhinney |
| 6,871,287 B1 | 3/2005 | Ellingson |
| 6,910,624 B1 | 6/2005 | Natsuno |
| 6,934,714 B2 | 8/2005 | Meinig |
| 6,954,757 B2 | 10/2005 | Zargham et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,028,001 B1 | 4/2006 | Muthuswamy et al. |
| 7,028,013 B2 | 4/2006 | Saeki |
| 7,028,052 B2 | 4/2006 | Chapman et al. |
| 7,035,855 B1 | 4/2006 | Kilger et al. |
| 7,046,139 B2 | 5/2006 | Kuhn et al. |
| 7,047,251 B2 | 5/2006 | Reed et al. |
| 7,050,989 B1 | 5/2006 | Hurt et al. |
| 7,076,475 B2 | 7/2006 | Honarvar |
| 7,133,935 B2 | 11/2006 | Hedy |
| 7,184,974 B2 | 2/2007 | Shishido |
| 7,185,016 B1 | 2/2007 | Rasmussen |
| 7,200,602 B2 | 4/2007 | Jonas |
| 7,209,895 B2 | 4/2007 | Kundtz et al. |
| 7,234,156 B2 | 6/2007 | French et al. |
| 7,246,740 B2 | 7/2007 | Swift et al. |
| 7,249,048 B1 | 7/2007 | O'Flaherty |
| 7,272,591 B1 | 9/2007 | Ghazal et al. |
| 7,356,516 B2 | 4/2008 | Richey et al. |
| 7,370,044 B2 | 5/2008 | Mulhern et al. |
| 7,403,942 B1 | 7/2008 | Bayliss |
| 7,433,864 B2 | 10/2008 | Malik |
| 7,451,113 B1 | 11/2008 | Kasower |
| 7,458,508 B1 | 12/2008 | Shao et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,536,346 B2 | 5/2009 | Aliffi et al. |
| 7,542,993 B2 | 6/2009 | Satterfield et al. |
| 7,548,886 B2 | 6/2009 | Kirkland et al. |
| 7,575,157 B2 | 8/2009 | Barnhardt et al. |
| 7,594,019 B2 | 9/2009 | Clapper |
| 7,596,512 B1 | 9/2009 | Raines et al. |
| 7,596,716 B2 | 9/2009 | Frost et al. |
| 7,610,216 B1 | 10/2009 | May et al. |
| 7,620,596 B2 | 11/2009 | Knudson et al. |
| 7,623,844 B2 | 11/2009 | Herrmann et al. |
| 7,653,600 B2 | 1/2010 | Gustin |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,689,487 B1 | 3/2010 | Britto et al. |
| 7,689,505 B2 | 3/2010 | Kasower |
| 7,690,032 B1 | 3/2010 | Peirce |
| 7,707,122 B2 | 4/2010 | Hull et al. |
| 7,708,190 B2 | 5/2010 | Brandt et al. |
| 7,739,707 B2 | 6/2010 | Sie et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,384 B2 | 7/2010 | Madhogarhia |
| 7,769,697 B2 | 8/2010 | Fieschi et al. |
| 7,787,869 B2 | 8/2010 | Rice et al. |
| 7,792,715 B1 | 9/2010 | Kasower |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,809,797 B2 | 10/2010 | Cooley et al. |
| 7,814,005 B2 | 10/2010 | Imrey et al. |
| 7,818,228 B1 | 10/2010 | Coulter |
| 7,841,004 B1 | 11/2010 | Balducci et al. |
| 7,849,014 B2 | 12/2010 | Erikson |
| 7,853,493 B2 | 12/2010 | DeBie et al. |
| 7,912,865 B2 | 3/2011 | Akerman et al. |
| 7,970,679 B2 | 6/2011 | Kasower |
| 7,983,932 B2 | 7/2011 | Kane |
| 7,996,912 B2 | 8/2011 | Spalink et al. |
| 8,005,759 B2 | 8/2011 | Hirtenstein et al. |
| 8,099,341 B2 | 1/2012 | Varghese |
| 8,127,986 B1 | 3/2012 | Taylor et al. |
| 8,195,549 B2 | 6/2012 | Kasower |
| 8,234,498 B2 | 7/2012 | Britti et al. |
| 8,285,656 B1 | 10/2012 | Chang et al. |
| 8,312,033 B1 | 11/2012 | McMillan |
| 8,321,952 B2 | 11/2012 | Spalink et al. |
| 8,392,334 B2 | 3/2013 | Hirtenstein et al. |
| 8,705,718 B2 * | 4/2014 | Baniak et al. ............ 379/201.02 |
| 2001/0011245 A1 | 8/2001 | Duhon |
| 2002/0026507 A1 | 2/2002 | Sears et al. |
| 2002/0069122 A1 | 6/2002 | Yun et al. |
| 2002/0077964 A1 | 6/2002 | Brody et al. |
| 2002/0099628 A1 | 7/2002 | Takaoka et al. |
| 2002/0099824 A1 | 7/2002 | Bender et al. |
| 2002/0103809 A1 | 8/2002 | Starzl et al. |
| 2002/0128962 A1 | 9/2002 | Kasower |
| 2002/0133504 A1 | 9/2002 | Vlahos et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0061163 A1 | 3/2003 | Durfield |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0115133 A1 | 6/2003 | Bian |
| 2003/0171942 A1 | 9/2003 | Gaito |
| 2003/0195859 A1 | 10/2003 | Lawrence |
| 2003/0212654 A1 | 11/2003 | Harper et al. |
| 2003/0229892 A1 | 12/2003 | Sardera |
| 2004/0010458 A1 | 1/2004 | Friedman |
| 2004/0030649 A1 | 2/2004 | Nelson et al. |
| 2004/0044628 A1 | 3/2004 | Mathew et al. |
| 2004/0098625 A1 | 5/2004 | Lagadec et al. |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0153330 A1 | 8/2004 | Miller et al. |
| 2004/0167793 A1 | 8/2004 | Masuoka et al. |
| 2004/0193891 A1 | 9/2004 | Ollila |
| 2004/0199456 A1 | 10/2004 | Flint et al. |
| 2004/0199789 A1 | 10/2004 | Shaw et al. |
| 2004/0225594 A1 | 11/2004 | Nolan, III et al. |
| 2004/0230527 A1 | 11/2004 | Hansen et al. |
| 2005/0027983 A1 | 2/2005 | Klawon |
| 2005/0058262 A1 | 3/2005 | Timmins et al. |
| 2005/0137899 A1 | 6/2005 | Davies et al. |
| 2005/0154665 A1 | 7/2005 | Kerr |
| 2005/0192008 A1 | 9/2005 | Desai et al. |
| 2005/0226224 A1 * | 10/2005 | Lee et al. ............ 370/352 |
| 2005/0288998 A1 | 12/2005 | Verma et al. |
| 2006/0020611 A1 | 1/2006 | Gilbert et al. |
| 2006/0041464 A1 | 2/2006 | Powers et al. |

(56) References Cited

U.S. PATENT DOCUMENTS

| | | |
|---|---|---|
| 2006/0059110 A1 | 3/2006 | Madhok et al. |
| 2006/0074986 A1 | 4/2006 | Mallalieu et al. |
| 2006/0074991 A1 | 4/2006 | Lussier et al. |
| 2006/0129481 A1 | 6/2006 | Bhatt et al. |
| 2006/0161435 A1 | 7/2006 | Atef et al. |
| 2006/0178971 A1 | 8/2006 | Owen et al. |
| 2006/0229943 A1 | 10/2006 | Mathias et al. |
| 2006/0229961 A1 | 10/2006 | Lyftogt et al. |
| 2006/0242047 A1 | 10/2006 | Haggerty et al. |
| 2006/0253358 A1 | 11/2006 | Delgrosso et al. |
| 2006/0262929 A1 | 11/2006 | Vatanen et al. |
| 2006/0271457 A1 | 11/2006 | Romain et al. |
| 2006/0271472 A1 | 11/2006 | Cagan |
| 2006/0282359 A1 | 12/2006 | Nobili et al. |
| 2007/0005508 A1 | 1/2007 | Chiang |
| 2007/0027816 A1 | 2/2007 | Writer |
| 2007/0047714 A1* | 3/2007 | Baniak et al. ............ 379/201.02 |
| 2007/0067297 A1 | 3/2007 | Kublickis |
| 2007/0067437 A1 | 3/2007 | Sindambiwe |
| 2007/0073889 A1 | 3/2007 | Morris |
| 2007/0078985 A1 | 4/2007 | Shao et al. |
| 2007/0083460 A1 | 4/2007 | Bachenheimer |
| 2007/0112667 A1 | 5/2007 | Rucker |
| 2007/0118393 A1 | 5/2007 | Rosen et al. |
| 2007/0124256 A1 | 5/2007 | Crooks et al. |
| 2007/0156554 A1 | 7/2007 | Nikoley et al. |
| 2007/0160458 A1 | 7/2007 | Yen |
| 2007/0174186 A1 | 7/2007 | Hokland |
| 2007/0174448 A1 | 7/2007 | Ahuja et al. |
| 2007/0204338 A1* | 8/2007 | Aiello et al. ..................... 726/11 |
| 2007/0220611 A1 | 9/2007 | Socolow et al. |
| 2007/0282730 A1 | 12/2007 | Carpenter et al. |
| 2007/0282736 A1 | 12/2007 | Conlin et al. |
| 2007/0288355 A1 | 12/2007 | Roland et al. |
| 2007/0299759 A1 | 12/2007 | Kelly |
| 2008/0010206 A1 | 1/2008 | Coleman |
| 2008/0010687 A1 | 1/2008 | Gonen et al. |
| 2008/0052182 A1 | 2/2008 | Marshall |
| 2008/0059224 A1 | 3/2008 | Schechter |
| 2008/0071682 A1 | 3/2008 | Dominguez |
| 2008/0103972 A1 | 5/2008 | Lanc |
| 2008/0175360 A1 | 7/2008 | Schwarz et al. |
| 2008/0183480 A1 | 7/2008 | Carlson et al. |
| 2008/0183504 A1 | 7/2008 | Highley |
| 2008/0228775 A1 | 9/2008 | Abhyanker et al. |
| 2008/0255992 A1 | 10/2008 | Lin |
| 2008/0281737 A1 | 11/2008 | Fajardo |
| 2008/0282324 A1 | 11/2008 | Hoal |
| 2008/0288299 A1 | 11/2008 | Schultz |
| 2008/0301016 A1 | 12/2008 | Durvasula et al. |
| 2008/0319889 A1 | 12/2008 | Hammad |
| 2009/0006230 A1 | 1/2009 | Lyda et al. |
| 2009/0037332 A1 | 2/2009 | Cheung et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0126013 A1 | 5/2009 | Atwood et al. |
| 2009/0177529 A1 | 7/2009 | Hadi |
| 2009/0177670 A1 | 7/2009 | Grenier et al. |
| 2009/0210241 A1 | 8/2009 | Calloway |
| 2009/0217342 A1 | 8/2009 | Nadler |
| 2009/0234665 A1 | 9/2009 | Conkel |
| 2009/0249451 A1 | 10/2009 | Su et al. |
| 2009/0260064 A1 | 10/2009 | Mcdowell et al. |
| 2009/0307778 A1 | 12/2009 | Mardikar |
| 2009/0327054 A1 | 12/2009 | Yao et al. |
| 2010/0043055 A1 | 2/2010 | Baumgart |
| 2010/0094758 A1 | 4/2010 | Chamberlain et al. |
| 2010/0114744 A1 | 5/2010 | Gonen |
| 2010/0114776 A1 | 5/2010 | Weller et al. |
| 2010/0145840 A1 | 6/2010 | Kasower |
| 2010/0153278 A1 | 6/2010 | Farsedakis |
| 2010/0169159 A1 | 7/2010 | Rose et al. |
| 2010/0174813 A1 | 7/2010 | Hildreth et al. |
| 2010/0179906 A1 | 7/2010 | Hawkes |
| 2010/0211636 A1* | 8/2010 | Starkenburg et al. ......... 709/203 |
| 2010/0241535 A1 | 9/2010 | Nightengale et al. |
| 2010/0250411 A1 | 9/2010 | Ogrodski |
| 2010/0257577 A1 | 10/2010 | Grandison et al. |
| 2010/0280914 A1 | 11/2010 | Carlson |
| 2011/0016042 A1 | 1/2011 | Cho et al. |
| 2011/0035788 A1 | 2/2011 | White et al. |
| 2011/0040629 A1 | 2/2011 | Chiu et al. |
| 2011/0060905 A1 | 3/2011 | Stack et al. |
| 2011/0113084 A1* | 5/2011 | Ramnani ....................... 709/201 |
| 2011/0137760 A1 | 6/2011 | Rudie et al. |
| 2011/0142213 A1* | 6/2011 | Baniak et al. ............. 379/93.02 |
| 2011/0164746 A1 | 7/2011 | Nice et al. |
| 2011/0166988 A1 | 7/2011 | Coulter |
| 2011/0179139 A1* | 7/2011 | Starkenburg et al. ......... 709/217 |
| 2011/0219421 A1 | 9/2011 | Ullman et al. |
| 2012/0110467 A1* | 5/2012 | Blake et al. ................... 715/745 |
| 2012/0110677 A1 | 5/2012 | Abendroth et al. |
| 2012/0303514 A1 | 11/2012 | Kasower |
| 2013/0279676 A1* | 10/2013 | Baniak et al. ............ 379/201.02 |
| 2014/0164519 A1* | 6/2014 | Shah ............................. 709/204 |

FOREIGN PATENT DOCUMENTS

| | | |
|---|---|---|
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 01/84281 | 11/2001 |
| WO | WO 2004/114160 | 12/2004 |
| WO | WO 2008/022289 | 2/2008 |
| WO | WO 2008/054403 | 5/2008 |
| WO | WO 2009/117518 | 9/2009 |
| WO | WO 2010/132492 | 11/2010 |

OTHER PUBLICATIONS

U.S. Appl. No. 12/705,511, filed Feb. 12, 2010, Bargoli et al.
Chores & Allowances. "Do Kids Have Credit Reports?", Oct. 15, 2007, http://choresandallowances.blogspot.com/2007/10/dO-kids-have-credit-reports.html.
"Debt Settlement: Watch Video on how to Pay Your Debt Faster", http://www.debtconsolidationcare.com/debt-settlement.html printed Jan. 9, 2013 in 6 pages.
Ettorre, Paul Kahn on Exceptional Marketing, Management Review, vol. 38(11), Nov. 1994, pp. 48-51.
Gibbs, Adrienne; "Protecting Your Children from Identity Theft," Nov. 25, 2008, http://www.creditcards.com/credit-card-news/identity-ID-theft-and-kids-children-1282.php, pp. 4.
ID Theft Assist, "Do You Know Where Your Child's Credit Is?", Nov. 26, 2007, http://www.idtheftassist.com/pages/story14.
IDEON, Credit-Card Registry that Bellyflopped this Year, Is Drawing some Bottom-Fishers, The Wall Street Journal, Aug. 21, 1995, pp. C2.
"Japan's JAAI system appraises used cars over internet", Asia Pulse, Mar. 3, 2000.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Loshin, Intelligent Enterprise: Better Insight for Business Decisions, "Value-Added Data: Merge Ahead", Feb. 9, 2000, vol. 3, No. 3, 5 pages.

(56) References Cited

OTHER PUBLICATIONS

Magid, Lawrence, J., Business Tools: When Selecting an ASP Ensure Data Mobility, Los Angeles Times, Feb. 26, 2001, vol. C, Issue 4, pp. 3, Los Angeles, CA.

Miller, Joe, "NADA used-car prices go online", Automotive News, Jun. 14, 1999, p. 36.

"PremierGuide Announces Release 3.0 of Local Search Platform", Business Wire, Mar. 4, 2004, Palo Alto, CA, p. 5574.

"Qualifying for Debt Settlement", http://www.certifieddebt.com/debt/settlement-qualifications.shtml printed Jan. 9, 2013 in 2 pages.

Ramaswamy, Vinita M., Identity-Theft Toolkit, The CPA Journal, Oct. 1, 2006, vol. 76, Issue 10, pp. 66-70.

"Resolve Debt for Less: With Help from Freedom Financial" http://www.debtsettlementusa.com/ printed Jan. 9, 2013 in 6 pages.

Sawyers, Arlena, "NADA to Offer Residual Guide", Automotive News, May 22, 2000, p. 3.

Sax, Michael M., Data Collection and Privacy Protection: An International Perspective, Presentation: Managing Online Risk and Liability Conference, Aug. 31, 1999, pp. 58.

"Settling Your Debts—Part 1 in Our Debt Settlement Series", http://www.creditinfocenter.com/debt/settle_debts.shtml printed Jan. 9, 2013 in 6 pages.

Tao, Lixin, "Shifting Paradigms with the Application Service Provider Model"; Concordia University, Canada; IEEE; Oct. 2001.

Vamosi, Robert, "How to Handle ID Fraud's Youngest Victims," Nov. 21, 2008, http://news.cnet.com/8301-10789_3-10105303-57.html.

"WashingtonPost.com and Cars.com launch comprehensive automotive web site for the Washington area", PR Newswire, Oct. 22, 1998.

International Search Report and Written Opinion for Application No. PCT/US09/60393, dated Dec. 23, 2009.

International Search Report and Written Opinion for Application No. PCT/US09/37565, dated May 12, 2009.

International Search Report and Written Opinion for Application No. PCT/US10/34434, dated Jun. 23, 2010.

* cited by examiner

PROFILE DATA MANAGEMENT

BACKGROUND

Generally, user computing devices and computing systems may facilitate the management of a user's personal data. For example, the user may use social networking sites, elastic on-demand storage systems (for example, cloud computing systems), or remote file sharing services, as well as the user's own personal computer or mobile device as means to store personal data and/or personal information. The user's use of the Internet may result in a wide distribution of the user's personal information to many different computing systems, devices, and other users. For example, social networking sites, online retailers, and/or blogs may contain personal information about the user.

Generally, when a user wishes to register with, for example, a social networking site, credit monitoring service, blog, and/or other online service, where a profile of the user may be created, the user will manually enter all of the information needed to complete the user's profile. These tasks become redundant if the user has multiple profiles with different entities. In addition, as the number of services with which the user is registered grows, the user's personal data and personal information may become disorganized, incongruent, and/or lost. For example, when a user changes their address, the user may forget to update one or more of their related profiles with the updated address.

SUMMARY

In an embodiment, a profile data management system provides a central repository for data and information associated with a user. The information may be presented through an electronic user interface as an electronic profile of the user. For example, the user's profile may be viewable through a web browser on a computing device such as a laptop computer. The user profile may include information about the user including, for example, the user's name, the user's photo, the user's contact information and employer, and/or the user's education and interests, among others. In an embodiment, the user's profile data may initially be provided by the user. Alternatively, the user's profile data may initially be compiled automatically by the profile data management system from a variety of sources including, for example, social-networking services or other types of services that may be electronically accessible over a network (such as the Internet), and/or on the World Wide Web. In another alternative, the user's profile data may initially be provided by secondary users, such as friends or acquaintances of the user, or others who have information about the user.

In an embodiment, the profile data management system also enables the user and secondary users to modify the user's profile. For example, while the profile data management system may contain contact information associated with a user, a third-party user (a "secondary user") may choose to submit updated and/or additional contact information associated with the user. The updated and/or additional contact information may be evaluated by the profile data management system for reliability, and a reliability index may be calculated. In an embodiment, the user's profile is updated with the contact information submitted by the third-party when the contact information is determined to have a reliability index above a certain threshold. Additionally, other types of information may be submitted by third-parties and/or the user.

In an embodiment, the profile data management system maintains profiles for many users. For example, the profile data management system may store personal information and profiles for hundreds of thousands, millions, billions, or even more users. In an embodiment, profiles are maintained for individuals who are not registered users of the profile data management system. In an embodiment, a user of the profile data management system may choose to keep one or more pieces of their personal information private. A user of the profile data management system may view the profiles of others, however, in certain embodiments, the information presented to the user may be limited and/or hidden. In some embodiments of the profile data management system, the information about others available to a particular user is based on the amount of information the user has provided. For example, the user may earn credits, or may advance to higher membership levels, as they provide additional information about themselves and/or others to the profile data management system. Credits may be used, in certain embodiments, to gain access to certain hidden or limited information about others. Alternatively, the user's membership level may determine the information to which the user may gain access.

In general, the method of building and/or modifying profiles in the profile data management system based on the contributions of many users may be referred to as crowdsourcing profiles. Similarly, the profiles stored by the profile data management system may be referred to as crowdsourced profiles. Crowdsourcing profiles may advantageously enable generation and verification of large amounts of data related to many individuals. The crowdsourcing profiles model allows secondary users to provide updates, modifications, comments, ratings, preferences, and/or other inputs to the profile data management system. Crowdsourcing profiles may advantageously reduce redundant profile management efforts by generating and/or updating profile data based on data that is reported as reliable by one or more users.

In general, a user of the profile data management system may view, create, modify, add, remove and/or claim their user profile. When claiming a profile, a user may be requested to provide authentication information to the profile data management system (and/or an affiliated authentication system). Once provided, the user may have access privileges to the profile data management system. Additionally, a user and/or secondary user may view and/or modify profiles of others via the profile data management system. Additions or modification of profile data may be stored at a user profile database, thus allowing the data to be viewed later by the same user or other users. By enabling other users to modify a user's profile, the profile data management system advantageously crowdsources profiles to generate and/or update data, and verify the reliability of the data generated.

User profile data management in a crowdsourcing environment may be enhanced by determining reliability of the inputs (including data submitted to the profile data management system). Because the inputs may be received from third parties, it is possible that the inputs to the profile data management system are unreliable and inaccurate with regards to a user's personal information. As a result, when inputs are provided from a user or a secondary user to the profile data management system, the system may be configured to determine the reliability of the inputs. In an embodiment, the reliability and/or calculated reliability index associated with a particular piece of data submitted to the profile data management system is based at least in part on several factors. These factors may include, but are not limited to, the timing of the inputs, the quality of the inputs, and/or the credibility of the secondary user providing the inputs, among others. The credibility of the secondary user may be determined based on, for example, a relationship between the secondary user and the subject user, the quality of the current and previous inputs made by the secondary user, and/or the education of the secondary user, among others.

In an embodiment, the profile data management system provides a user with options as to the particular information that is displayed with regards to a user profile. For example, in an embodiment, a user may choose to view only reliable data (in other words, data above a particular reliability threshold) associated with the user profile. Alternatively, the user may choose to view both reliable and unreliable data associated with a user profile. In other embodiments, all data associated with the user profile may be displayed, for example based on a system or user preference. In one embodiment, a typeface, font, and/or color (among other possibilities) may be altered to denote that the data displayed is reliable. For example, the reliable data text may be italicized, highlighted, bolded, underlined, and/or color coded. Alternatively, an icon may denote reliable data. In certain embodiments, the same may be true of the unreliable data, or the unreliable data may remain unaltered.

In an embodiment, a computer-implemented method of managing user profile data in a crowd-sourced electronic environment is disclosed. The disclosed method comprises: as implemented by one or more computer systems comprising computer hardware and memory, the one or more computer systems configured with specific executable instructions, storing a plurality of profile data items associated with a primary user in an electronic data store accessible over a computer network; providing an electronic user profile to a plurality of secondary users, wherein the electronic user profile is provided over the computer network, and wherein the electronic user profile is populated with at least portions of the profile data items associated with the primary user and stored in the electronic data store; receiving an update to a first data item of the electronic user profile from a secondary user; analyzing the updated first data item and/or information associated with the secondary user to determine a reliability of updated first data item; and updating, in the electronic data store, the profile data associated with the primary user to include the determined reliability of updated first data item, wherein the updated first data item is provided for display to respective users based on a relationship between the determined reliability and a predetermined reliability threshold.

According to an aspect, the profile data items include one or more of: a name, a logo, a slogan, an e-mail address, an address, an age, a telephone number, a gender, a height, a weight, a physical characteristic, education data, vehicle(s) owned data, a residence, hobby data, interest data, an award, achievement data, a publication, a philanthropic endeavor, a political affiliation, a religious affiliation, a language, a professional skill, a marriage status, employment data, financial net worth data, criminal history data, or personal information.

According to another aspect, the reliability of the updated first data item is based on one or more of a relationship between the secondary user and the primary user, a number of updates provided by the secondary user, an educations level of the secondary user, a quality of updates provided by the secondary user, a timing of the update received from the secondary user, a credibility of the secondary user, a number of other secondary users having provided a similar update.

According to yet another aspect, the computer-implemented method further comprises, as further implemented by the one or more computer systems, in response to determining that the updated data item has a reliability that is above the predetermined reliability threshold, displaying the electronic user profile, including the updated data item, on a display device of another secondary user.

Further, in another aspect, the electronic user profile further includes, for each item of profile data displayed, a one or more endorsements, wherein the endorsements indicate a number of secondary users that providing updates similar to the item of profile data.

According to an aspect, the computer-implemented method further comprises, as further implemented by the one or more computer systems, in response to input from another secondary user requesting display of all profile data regardless of the reliability of the data items, displaying the electronic user profile, including the updated data item regardless of the reliability of the updated data item, on a display device of the another secondary user.

According to another aspect, the computer-implemented method further comprises, as further implemented by the one or more computer systems, receiving a request from another secondary user to access the electronic user profile; determining the identity of the requesting another secondary user; determining a credit level associated with the another secondary user; and providing access to at least a portion of the electronic user profile to the another secondary user, wherein access is provided based at least in part on at least one of the identity of the another secondary user and a credit level associated with the another secondary user.

According to yet another aspect, providing access comprises at least one of displaying the electronic user profile on a display device and transmitting profile data to a receiving electronic device.

According to another aspect, the credit level associated with the another secondary user is based at least in part on at least one of a history of electronic profile updates provided by the another secondary user, reliability scores associated with electronic profile updates provided by the another secondary user, and credit payments received from the another secondary user.

In another embodiment, a computer system is disclosed comprising: one or more hardware processors in communication with a computer readable medium storing software modules including instructions that are executable by the one or more hardware processors, the software modules including at least: a user interface module configured to access user profile data from an electronic data store in response to a request from a requestor for said user profile data, wherein said user interface module identifies said requestor and provides at least a portion of said user profile data to said requestor based on the identity of said requestor; a data modification module configured to receive one or more updates to the user profile data from said requestor; and a reliability index determination module configured to determine a reliability index associated with each of the received one or more updates, wherein said data modification module stores said one or more updates and respective determined reliability indices to said electronic data store.

According to an aspect, providing at least of portion of said user profile data comprises at least one of displaying the user profile data on a display device and transmitting the user profile data to a receiving electronic device, wherein the portion of the user profile data provided is based at least in part on a relationship between associated determined reliability indices and a predetermined reliability threshold.

According to another aspect, said one or more updates to the user profile data comprise at least one of a name, a logo, a slogan, an e-mail address, an address, a age, a telephone number, a gender, a height, a weight, a physical characteristic, education data, vehicle(s) owned data, a residence, hobby data, interest data, an award, achievement data, a publication, a philanthropic endeavor, a political affiliation, a religious affiliation, a language, a professional skill, a marriage status, employment data, financial net worth data, criminal history data, and personal information.

According to yet another aspect, said reliability index is determined based on at least one of a number of updates provided by the requestor, an educations level of the requestor, a quality of updates provided by the requestor, a timing of the one or more updates received from the requestor, a credibility of the requestor, a number of other requestor having provided a similar update.

In yet another embodiment, a non-transitory computer storage is disclosed having stored thereon a computer program that instructs a computer system to manage user profile data by at least: storing profile data associated with a primary user in an electronic data store accessible over a computer network; providing an electronic user profile to a plurality of secondary users, wherein the electronic user profile is provided over the computer network, and wherein the electronic user profile is populated with at least portions of the profile data associated the primary user and stored in the electronic data store; receiving one or more updates to the electronic user profile, each update provided by one of the plurality of secondary users; analyzing the one or more updates received from the plurality of secondary users to determine a reliability of each of the one or more updates; and updating, in the electronic data store, the profile data associated with the primary user to include updates to reliability indices of respective profile data items in view of the determined reliabilities of the profile data items.

According to an aspect, the non-transitory computer storage further included displaying the electronic user profile on a display device, wherein the displayed profile data is selected based at least in part on respective determined reliabilities.

According to another aspect, the displayed profiles data includes items having an associated reliability above a predetermined threshold.

According to yet another aspect, the displayed profiles data includes items having an associated reliability below a predetermined threshold.

According to another aspect, the non-transitory computer storage of claim 14, further includes: receiving a request from one of the plurality of secondary users to access the electronic user profile; determining the identity of the requesting secondary user; determining a credit level associated with the identified requesting secondary user; providing access to at least a portion of the electronic user profile to the identified requesting secondary user, wherein access is provided based at least in part on at least one of the identity of the requesting secondary user and the credit level associated with the requesting secondary user.

According to yet another aspect, providing access comprises at least one of displaying the electronic user profile on a display device and transmitting the electronic user profile data to a receiving electronic device.

BRIEF DESCRIPTION OF THE DRAWINGS

The following aspects and many of the attendant advantages of the disclosure will become more readily appreciated as the same become better understood by reference to the following detailed description, when taken in conjunction with the accompanying drawings, wherein.

DETAILED DESCRIPTION

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For the sake of brevity and clarity, the description of the profile data management system herein generally refers to users and secondary users of the profile data management system as if they are individuals. It is to be understood, however, that in various embodiments, users and or secondary users of the profile data management system may include, for example, individuals, groups of individuals (such as, for example, families, married couples, domestic partners, associations, groups, and/or organizations, among others), and/or business entities, among others. A user that accesses his/her own profile in the profile data management system may be referred to herein as a primary or subject user, while other users that access the primary user's profile are generally referred to as third-party or secondary users.

Also for the sake of brevity and clarity, any information or data, whether personal or not, that may be stored, processed, and/or transmitted by the profile data management system, may be referred to herein as "user profile data." In general, such user profile data pertains to the data and information stored, processed, and/or transmitted by the profile data management system for display on various user profiles. In various embodiments, this aforementioned information and data of the profile data management system may include, but is not limited to, one or more of the following profile data items: name, logo, slogan, e-mail address, address, age, telephone number, gender, height, weight, physical characteristics such as eye color and/or hair color, education, vehicle(s) owned, residence, hobbies, interests, awards, achievements, publications, philanthropic endeavors, political affiliations and/or views, religious affiliations and/or views, languages spoken, professional skills, marriage status, employment, financial net worth and/or history, criminal history, and/or other personal information.

Figure 1:
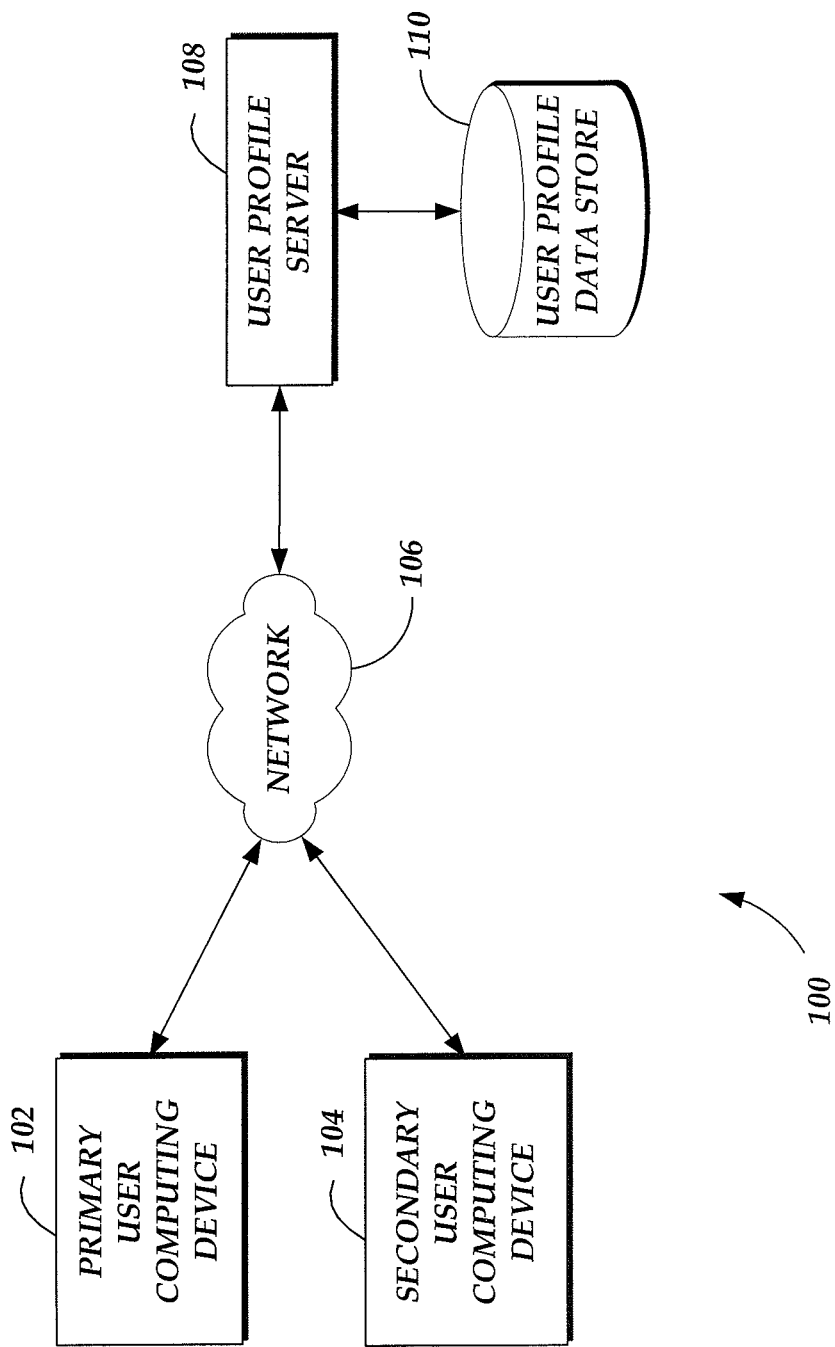
FIG. 1 is a block diagram of an illustrative network environment in which a profile data management system may operate, according to an embodiment of the present disclosure.

FIG. 1 is a block diagram of an illustrative network environment in which a profile data management system may operate, according to an embodiment of the present disclosure. The network environment 100 of FIG. 1 includes a primary user computing device 102, a secondary user computing device 104, a network 106, a user profile server 108, and a user profile data store 110. The constituents of the network environment 100 may be in communication with each other either locally or over the network 106. In general, the user profile data store 110 is in direct communication with the user profile server 108.

The secondary user computing device 104 and/or the primary user computing device 102 may be any computing device capable of communicating over the network 106, such as a laptop or tablet computer, personal computer, personal digital assistant (PDA), hybrid PDA/mobile phone, mobile phone, in-vehicle computer device or navigation system, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The secondary user computing device 104 and/or primary user computing device 102 may communicate over the network 106, for example, to obtain user profile data from the user profile server 108, or to transmit user profile data to the user profile server 108. In some instances, the secondary user computing device 104 and primary user computing device 102 may be configured to communicate with each other over the network 106 as well, or alternatively, the secondary user computing device 104 and primary user computing device 102 may be configured to communicate with each other directly.

In general, the secondary user computing device 104 is operated by an individual that is viewing, accessing, modifying, adding to, removing from, editing, verifying, discrediting, commenting on, and/or rating (among others) a user profile associated with an individual other than themselves. Similarly, in general, the primary user computing device 102 is operated by an individual that is viewing, accessing, modifying, adding to, removing from, editing, verifying, discrediting, commenting on, and/or rating (among others) their own user profile. Thus, for clarity and brevity, the present disclosure generally refers to the secondary user computing device 104 and the primary user computing device 102 in accordance with this convention (the distinction between the two being the individual that is operating the device). Additionally, users of the profile data management system may be referred to as primary users, while secondary users of the profile data management system may be referred to as secondary or secondary users. It is to be understood, however, that more or fewer user computing devices, and/or more or fewer users, may access the profile data management system and specifically the user profile server 108. In general, many users and/or user computing devices may access the profile data management system simultaneously, or substantially simultaneously. In an embodiment, the profile data management system stores personal information and profiles for hundreds of thousands, millions, billions, or even more users. Thus, the profile data management system enables crowdsourced profiles, with data being provided by many users, as described above. In an embodiment, profiles are maintained for individuals who are not registered users of the profile data management system.

The network 106 may be any wired network, wireless network, and/or combination thereof. In addition, the network 106 may be a personal area network, local area network, wide area network, cable network, satellite network, cellular telephone network, the Internet, and/or combination thereof. Protocols and components for communicating via the Internet or any of the other aforementioned types of communication networks are well known to those skilled in the art of computer communications and thus, need not be described in more detail herein.

The user profile server 108 is generally a computing device that may perform a variety of tasks to implement the user profile data storage, processing, and/or transmittal of the profile data management system. For example, the user profile server 108 may receive data inputs from users of the profile data management system (through, for example, the secondary user computing device 104 and/or the primary user computing device 102), may process those inputs, may determine reliability indexes related to those inputs, may store those inputs to the user profile data store 110, and/or may retrieve user profile data from the user profile data store 110 and transmit the data to one or more of the secondary user computing device 104 and the primary user computing device 102, among others. The user profile data is generally transmitted to and from the user profile server 108 over the network 106. Additional operations of the user profile server 108 are described in further detail with respect to FIG. 2.

The user profile data store 110 may store one or more items of user profile data, such as, but not limited to, names, photos, and/or telephone numbers, among others (as described above). The user profile data store 110 may be embodied in hard disk drives, solid state memories, and/or any other type of non-transitory (where non-transitory is synonymous with non-signal), computer-readable storage medium remotely or locally accessible to the user profile server 108. The user profile data store 110 may also be distributed or partitioned across multiple storage devices as is known in the art without departing from the spirit and scope of the present disclosure.

Figure 2:
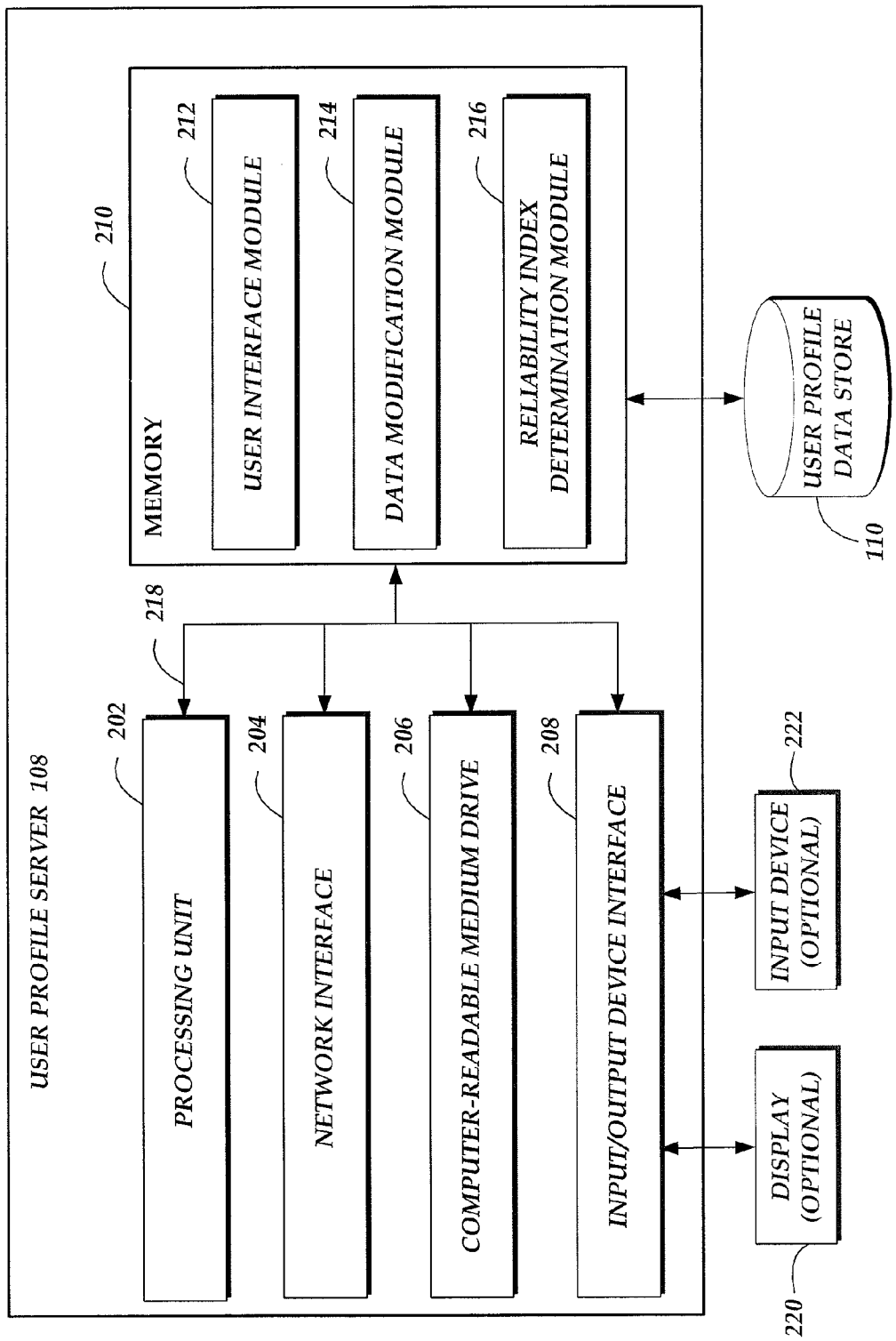
FIG. 2 is a block diagram of an illustrative user profile server, according to an embodiment of the present disclosure.

FIG. 2 shows an illustrative block diagram of the user profile server 108, according to an embodiment of the present disclosure. The user profile server 108 may include an arrangement of computer hardware and software elements that may be used to implement portions of the profile data management system. FIG. 2 depicts a general architecture of the user profile server 108 illustrated in FIG. 1. The user profile server 108 may include more (or fewer) components than those shown in FIG. 2. It is not necessary, however, that all of these generally conventional components be shown in order to provide an enabling disclosure.

The user profile server 108 includes a processing unit 202, a network interface 204, a non-transitory computer-readable medium drive 206, an input/output device interface 208, and a memory 210, all of which may communicate with one another by way of a communication bus. As illustrated, the user profile server 108 is optionally associated with, or in communication with, an optional display 220 and an optional input device 222. The optional display 220 and optional input device 222 may be used in embodiments in which users interact directly with the user profile server 108. The network interface 204 may provide user profile server 108 with connectivity to one or more networks or computing systems. The processing unit 202 may thus receive information and instructions from other computing systems (such as the secondary user computing device 104 and/or primary user computing device 102) or services via a network. The processing unit 202 may also communicate to and from memory 210, and further provide output information for the optional display 220 via the input/output device interface 208. The input/output device interface 208 may accept input from the optional input device 222, such as a keyboard, mouse, digital pen, touch screen, or gestures recorded via motion capture. The input/output device interface 208 may also output audio data to speakers or headphones (not shown).

The memory 210 contains computer program instructions that the processing unit 202 executes in order to implement one or more embodiments of the profile data management system. The memory 210 generally includes RAM, ROM and/or other persistent or non-transitory computer-readable storage media. The memory 210 may store an operating system software (such as Windows XP, Windows Vista, Windows 7, Windows 8, Windows Server, Unix, Linux, SunOS, Solaris, Macintosh OS X, or other compatible and/or proprietary operating systems) that provides computer program instructions for use by the processing unit 202 in the general administration and operation of the user profile server 108. The memory 210 may further include other information for implementing aspects of the profile data management system. For example, in one embodiment, the memory 210 includes a user interface module 212 that facilitates generation of user interfaces (such as by providing instructions therefor) for display upon a computing device such as the secondary user computing device 104 and/or the primary user computing device 102. For example, a user interface may be displayed via a navigation interface such as a web browser installed on the secondary user computing device 104 and/or the primary user computing device 102. Exemplary user interfaces generated by the user interface module 212 are described in reference to FIGS. 4A, 4B, 5A, 5B, and 9 below. In addition, memory 210 may include or communicate with the user profile data store 110. User profile data stored in the user profile data store 110 may include various types of items of data as described above.

In addition to the user interface module 212, the memory 210 may include a data modification module 214 and a reliability index determination module 216, each of which may be executed by the processing unit 202. In certain embodiments, the data modification module 214 may be used to implement user profile data receipt, modification, storage, and/or transmittal, example operations of which are discussed below and with respect to FIGS. 3A, 3B, 6 and 8 below. In certain embodiments, the reliability index determination module 216 may be used to implement the reliability index (also referred to as the reliability score) determination, example operations of which are discussed below and with respect to FIGS. 6 and 7 below. In some embodiments, the reliability index determination module 216 may access the user profile data store 110 and/or other data sources to determine the reliability of the received inputs from the secondary user computing device 104 and/or the primary user computing device 102. The reliability index determination module 216 may process, analyze, compare, relate and/or calculate the received inputs to determine a reliability index. The reliability index determination module 216 may update the user profile data store 110 with a reliability index or other reliability information associated with user profile data. The data modification module 214 and reliability index determination module 216 may additionally enable the crowdsourced profiles and crowdsourced profile management as described above.

In an embodiment, the user interface module 212, data modification module 214, and/or reliability index determination module 216 may be stored in the computer-readable medium drive 206 as executable software codes that are executed by the processing unit 202. The modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user profile server 108, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Those skilled in the art will recognize that in some embodiments, the functionality of the user profile server 108 may be implemented partially or entirely by the secondary user computing device 104 and/or the primary user computing device 102. Accordingly, either the secondary user computing device 104 or the primary user computing device 102, or both, may include the data modification module 214 and/or the reliability index determination module 216, and other components that operate similarly to the components illustrated as part of the user profile server 108, including a processing unit 202, network interface 204, non-transitory computer-readable medium drive 206, input/output interface 208, memory 210, user interface module 212, and so forth.

It will be recognized that many of the devices described herein are optional and that embodiments of network environment 100 may or may not combine devices. Moreover, the secondary user computing device 104, the primary user computing device 102, and/or the user profile server 108 may each be embodied in a plurality of devices, each executing an instance of the respective devices. However, devices need not be distinct or discrete. Devices may also be reorganized in the network environment 100. For example, the user profile server 108 may be represented in a single physical server or, alternatively, may be split into multiple physical servers. The entirety of the functions of the user profile server 108 may be represented in a single user computing device as well. Additionally, it should be noted that in some embodiments, the functionality of the user profile server 108 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Example User Profile Generation Method

Figure 3A:
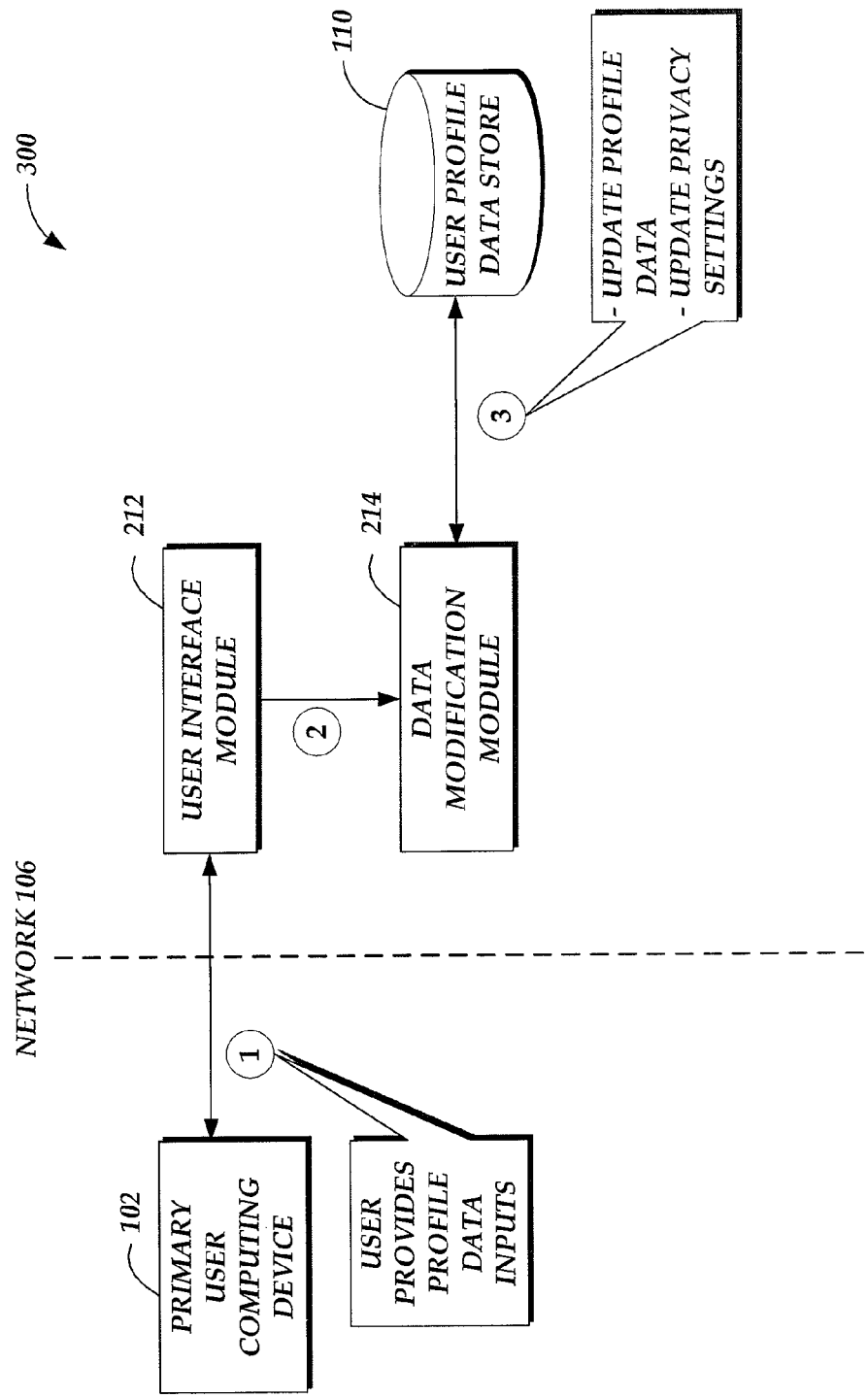
FIG. 3A is a data flow diagram illustrating an embodiment of the profile data management system in which a user profile may be created.

Turning to FIG. 3A, a data flow diagram illustrating an embodiment of the profile data management system, in which a user profile may be created, is shown. An exemplary data flow 300 of the profile data management system includes the network 106, the primary user computing device 102, the user interface module 212, the data modification module 214, and the user profile data store 110. In the exemplary data flow 300, the primary user computing device 102 is in communication with the user interface module 212 over the network 106. The user interface module 212 and the data modification module 214 are in communication with each other, generally within the user profile server 108, as described above in reference to FIG. 2 (but via one or more networks in other embodiments). Additionally, the data modification module 214 is in communication with the user profile data store 110.

At step 1, a primary user of the profile data management system, through the primary user computing device 102, provides user profile data inputs. The user profile data inputs may comprise any of the user profile data types discussed above. Generally, the user profile data inputs are transferred and/or transmitted over the network 106, through the user interface module 212. The user interface module 212 provides an interface through which the user may provide the inputs. Such an interface is shown in each of FIGS. 4A and 4B, each of which will now be described.

Figure 4A:
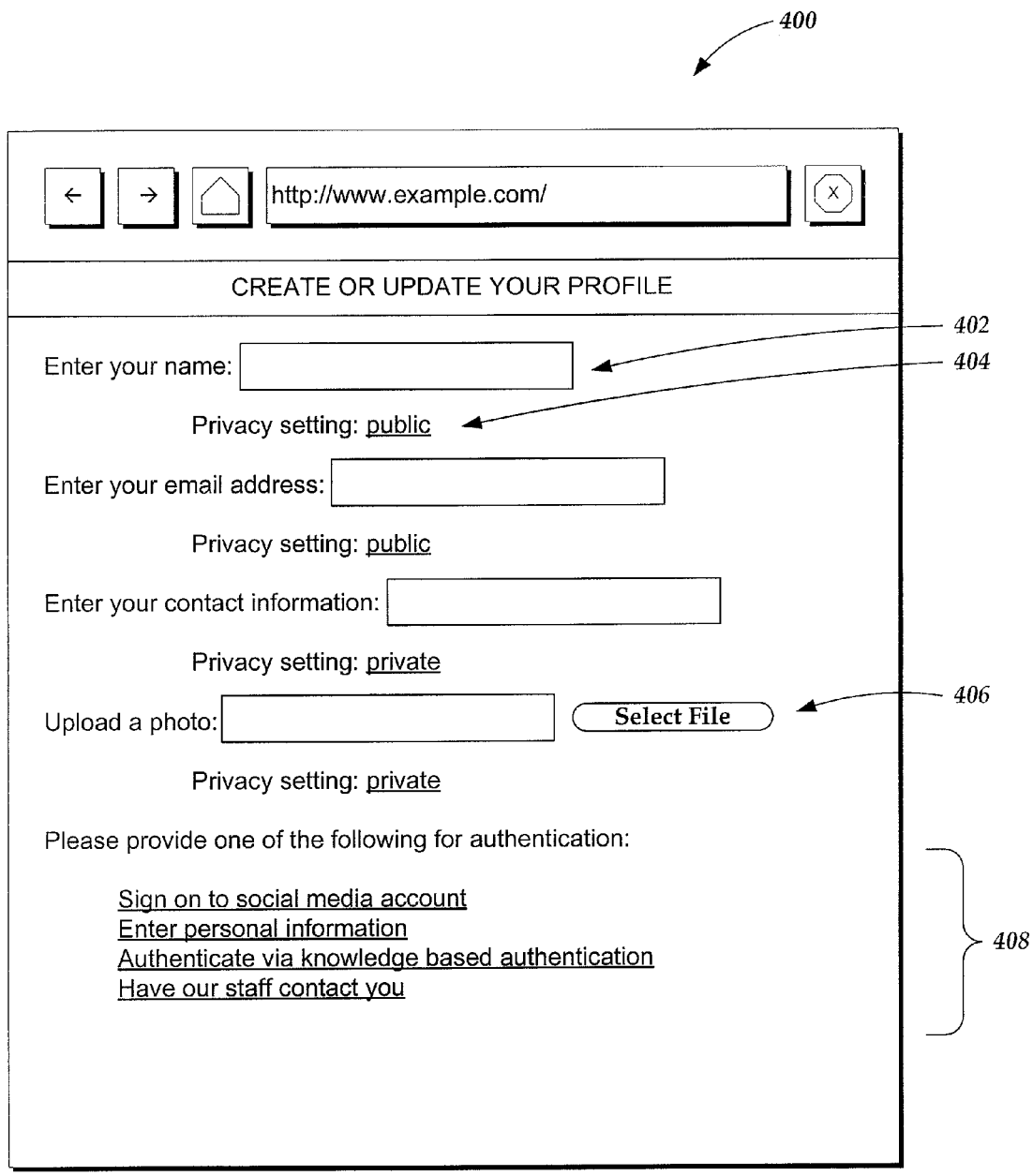
FIG. 4A is an illustrative user interface of the profile data management system in which a user profile may be created, according to an embodiment of the present disclosure.

FIG. 4A is an illustrative user interface of the profile data management system in which a user profile may be created, according to an embodiment of the present disclosure. The user interface 400 could be viewed on any computing device able to network with the user profile server 108 (such as the primary user computing device 102), including a computer, laptop, mobile phone, PDA, or other computing device. In one embodiment, a user may access user interface 400 by entering in a specific URL associated with the user interface 400. Alternatively, in other embodiments a user may access the user interface 400 from a login page or by clicking a user interface link on a different page.

In the user interface 400 of FIG. 4A, a primary user may create or update their profile. In text box 402 the user may enter their name. Further, privacy setting 404 indicates that the user's name will be public, meaning anyone who visits the user's profile will be able to see the user's name. The user may click the privacy link 404 to change the privacy setting to private, or, in certain embodiments, the user may select individuals and/or groups that may view the primary user's name. Similarly, the primary user may specify their email address (and associated privacy setting), and their contact information (and associated privacy setting). The primary user may use the select file button 406 to upload a photo of themselves, and use the privacy setting button to set a privacy level of the uploaded photo to "private". In the user interface 400, the privacy settings of the contact information and the photo are set to private. Depending on the embodiment, various privacy levels may be available for selection by the primary user for individual information items and/or groups of information items provided by the primary user (and/or later provided by secondary users).

In an embodiment, the user may visit the user interface 400 to update their profile information. In such an embodiment, the user's current information may be prefilled in the text boxes.

In some embodiments, additional, or different, user profile data fields may be available to the user on the Create or Update Profile user interface 400. FIG. 4A is only an exemplary embodiment of such a user interface.

Additionally, as shown in section 408 of the user interface 400, in an embodiment the primary user provides authentication to verify and/or claim their profile through one of the listed methods below the authentication prompt. These methods include a social media authentication link, a personal information authentication link, a knowledge-based authentication link, and a staff contact authentication link. In other embodiments, the authentication prompt and listed methods are modified to include other possible authentication methods. In an embodiment, the authentication prompt and listed methods are modified to not include all of the displayed methods. In other embodiments, the displayed methods are not displayed as a link, and instead, a user selects the authentication method via a button, radio button or some other selection mechanism. In an embodiment, the user is not provided a choice of authentication method, but instead is asked authentication questions and/or asked for authentication information based on a default authentication protocol of the system.

The user may complete authentication via the social media authentication link. For example, the user can click on the link to sign on to a social media account associated with the user. By logging into the linked social media account, the user provides authentication to the profile data management system, which then allows the user to claim and verify the user profile in question. In other embodiments, the user may be prompted after logging into the social media account to respond to an authentication request from the profile data management system via the logged in social media account.

The user may also use the personal information authentication link to claim and/or verify the user profile. The user may click on the link to access a user interface allowing the user to enter personal information to authenticate the profile. Personal information that may be entered may include a home address, e-mail address, telephone number, or other personal information. In one embodiment, the personal information is entered through a user interface. However, other embodiments may use other methods for securing personal information for authentication from the user.

The user may also click on the knowledge-based authentication link to claim the profile. By choosing this link, the user claims the profile via knowledge-based authentication, such as by answering questions that only the user would know. For example, knowledge-based authentication may include asking questions to the user based on information in a credit report of the user, such as previous residence addresses, current lenders, among others.

The user may also choose the staff contact authentication link. This selection causes the user to be contacted through mail, text message, email, telephone, or some other manner by staff associated with the profile data management system to complete the profile claim and/or verification.

In an embodiment, the user's profile data may initially be compiled automatically by the profile data management system from a variety of sources including, for example, social-networking service or other types of service that may be electronically accessible over a network (such as the Internet), and/or on the World Wide Web. In another alternative, the user's profile data may initially be provided by secondary users, such as friends or acquaintances of the user, or others who have information about the user. In either of these embodiments, a user may advantageously gain access to the initially provided data by authenticating themselves with the profile data management system. Once authenticated, the data drawn from a variety of sources, and/or others who have information about the user, may be used to populate the user's profile. Examples of systems and processes by which the user's profile data may be complied manually and/or automatically may be found in at least U.S. patent application Ser. No. 13/779,492, filed Feb. 27, 2013, and entitled "Profile Builder," which application is hereby incorporated by reference herein in its entirety and for all purposes.

Figure 4B:
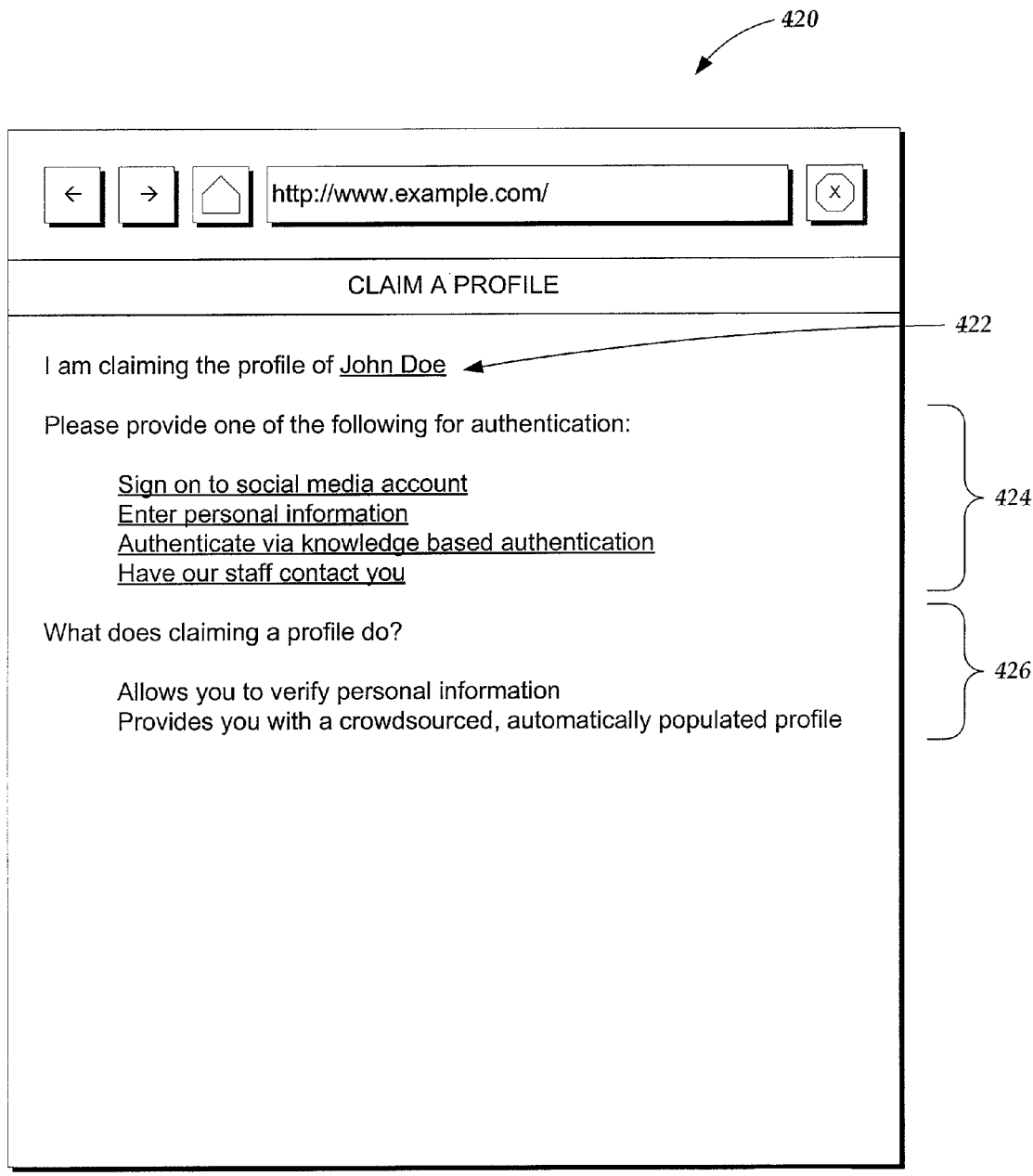
FIG. 4B is an illustrative user interface of the profile data management system in which a user profile may be claimed, according to an embodiment of the present disclosure.

Turning to FIG. 4B, similar to FIG. 4A, an illustrative user interface of the profile data management system, according to an embodiment of the present disclosure, is shown. In FIG. 4B, however, a user interface 420, in which a user profile may be claimed, is shown.

In the user interface 420 of FIG. 4B, the user may claim an existing profile, such as an existing profile that has been initially created automatically, or by other users of the profile data management system. The user may determine which profile they are claiming by looking at the user profile identifier 422. In an embodiment, the user profile identifier 422 displays the name of the user associated with the user profile claimed. The user profile identifier 422 may include a link to a user interface to display the data associated with the identified user profile. In other embodiments, user profile identifier 422 may display other personal information, such as an email address, telephone number, address, or other information. In other embodiments, the user profile identifier 422 may provide an encrypted identifier. In other embodiments, the user profile identifier 422 does not link to the identified user profile.

As shown the user interface 420 at 424, in an embodiment the user provides authentication to verify and/or claim their profile through one of the listed methods below the authentication prompt. This claiming and/or verification is accomplished in much the same way as described above with respect to FIG. 4A.

The user interface 420 also includes a profile claiming explanation 426. In an embodiment, the profile claiming explanation 426 may be a link to another user interface with additional explanation. In an embodiment, the profile claiming explanation includes links for each given reason. Each linked reason when clicked may then display another user interface with more detailed information about that particular reason for claiming a profile.

In an embodiment, the profile data management system additionally includes an authentication module that enables the authentication steps described above with reference to FIGS. 4A and 4B.

Returning again to FIG. 3A, at step 2, the user profile data inputs are transferred through the user interface module 212, to the data modification module 214. At step 3, the data modification module 214 accesses the user profile data store 110 to update the user profile data and associated privacy settings provided or modified by the user.

In embodiments in which the user's profile data is initially pre-populated, and/or the user is claiming an existing profile, such functionality may be accomplished as the initially gathered data is accessed from the user profile data store 110 by the data modification module 214, and transferred to the user interface module 212 for display to the user. The user may then be provided with the opportunity to modify and or accept the provided user profile data.

In some embodiments, more or fewer steps may be included in the exemplary data flow 300. Additionally, the steps of the exemplary data flow 300 may occur in a different order, and/or any of the steps may be entirely absent.

Figure 3B:
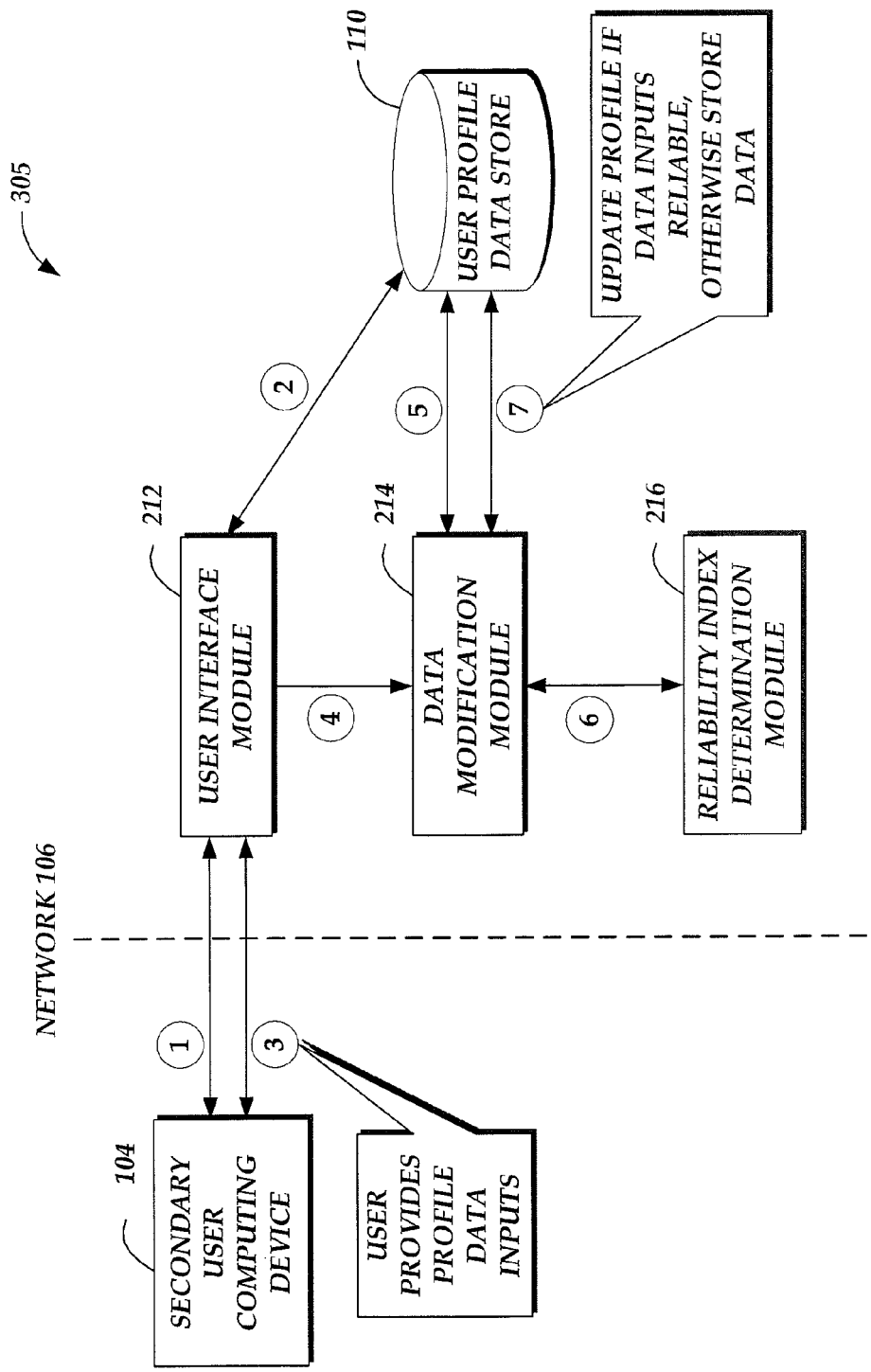
FIG. 3B is a data flow diagram illustrating an embodiment of the profile data management system in which a user profile may be modified.

FIG. 3B is a data flow diagram illustrating an embodiment of the profile data management system in which a user profile of a primary user may be modified by inputs from one or more secondary users. An exemplary data flow 305 of the profile data management system includes the network 106, the secondary user computing device 104, the user interface module 212, the data modification module 214, the reliability index determination module 216, and the user profile data store 110. In the exemplary data flow 305, the secondary user computing device 104 is in communication with the user interface module 212 over the network 106. The user interface module 212, data modification module 214, and user profile data store 110 are also in communication with one another, either locally or over a network (such as network 106). Additionally, the data modification module 214 is in communication with the reliability index determination module 216, typically locally, as described above in reference to FIG. 2. As described above in reference to FIG. 2, generally, the user interface module 212, data modification module 214, and reliability index determination module 216 operate within the user profile server 108.

At step 1 of the exemplary data flow 305, generally a secondary user, through the secondary user computing device 104, requests to view a user profile (of a primary user). Such a request may be accomplished, for example, through a web browser on a laptop (or other computing device). The request is transmitted over the network 106.

At step 2, the user interface module 212 then accesses the user profile data store 110 to retrieve the requested user profile data. The requested user profile is then generated and transmitted to and displayed on the secondary user computing device 104.

At step 3, the secondary user provides user profile data inputs associated with the initially requested primary user profile to the user interface module 212, where they are received. The provided data inputs may include any of the types of user profile data described above, which may then be transmitted over the network 106 to the user interface module 212.

At step 4, the provided user profile data inputs are delivered to the data modification module 214. At step 5, the data modification module 214 accesses the currently stored user profile data associated with the user of the requested user profile, such that the currently stored user profile data and the provided user profile data inputs may be compared.

At step 6, the currently stored user profile data and the provided user profile data inputs are accessed by the reliability index determination module 216 where they are analyzed in order to determine reliability indices for respective user profile data inputs. Details regarding the calculation of reliability indices will be described below with reference to FIGS. 6 and 7.

At step 7, the data modification module 214 stores the provided user profile data inputs in the user profile data store 110. In one embodiment, if the reliability index for a particular user profile data input (e.g., a phone number) is above a particular threshold, then the provided user profile data inputs are used to update the current user profile data. On the other hand, if the reliability index is below the particular threshold, the provided inputs are stored for future retrieval. Such stored inputs constitute less reliable data that may be used for future reliability calculations and/or may be provided to users who desire to see less reliable user profile data. In an embodiment, all profile data inputs are stored, along with their respective reliability indices. In this embodiment, as is described below in reference to FIGS. 5-7, when a user profile is viewed by a secondary user, the user profile data included on the display may be at least partially dependent on the respective reliability indices. In an embodiment, the reliability thresholds may be different for different types of profile data. For example, a reliability threshold for a user phone number may be higher than a reliability threshold for user's interests.

In some embodiments, more or fewer steps may be included in the exemplary data flow 305. Additionally, the steps of the exemplary data flow 305 may occur in a different order, and/or any of the steps may be entirely absent.

Figure 5A:
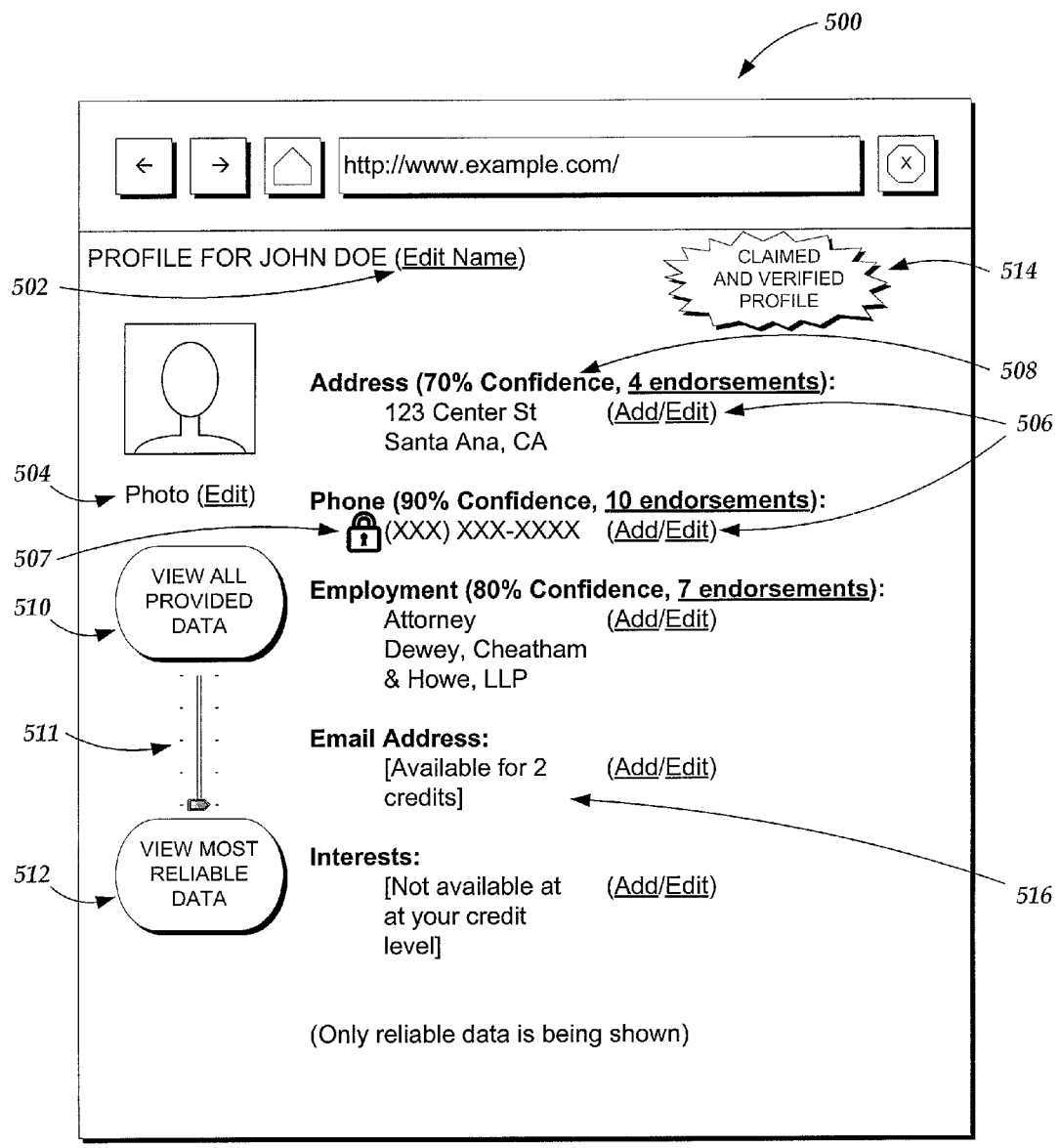
FIG. 5A is an illustrative user interface of the profile data management system in which a user profile is displayed, according to an embodiment of the present disclosure.

FIG. 5A is an illustrative user interface of the profile data management system in which a user profile is displayed, according to an embodiment of the present disclosure. A user interface 500 is shown in which a user or a secondary user may view or modify a user profile. For purposes of discussion herein, user interface of FIG. 5A will be referred to as being viewed by a secondary user, although the user interface could be viewed by the primary user also.

The user interface 500 allows secondary users to view or modify different data associated with the primary user's profile. Similar to the description given above with reference to FIGS. 4A and 4B, the user interface 500 may be viewed on any computing device able to network with the profile data management system, including a computer, laptop, mobile phone, PDA, or other computing device.

In the user interface 500, a user profile identifier edit link 502 is provided to let a secondary user provide a suggested revision (in the form of a "data input") to a profile identifier (for example, a user name, e-mail address, telephone number, address, or other data). The profile identifier may, in other embodiments, include an encrypted identifier. In other embodiments, the user profile identifier is a link that can be clicked to allow the identifier to be modified. In other embodiments, the edit link 500 is not provided for user profiles that are only available for viewing, and not modification.

The user interface 500 also includes a claimed and verified profile badge 514. The claimed and verified profile badge 514 is provided to indicate whether the displayed profile has been claimed and verified by the primary user. In other embodiments, the claimed and verified profile badge 514 may indicate other information, such as the level of reliability of the contained data, whether the profile is complete, whether the profile is new, and other information. For example, different badges (for example, different icons) may be associated with a primary user based on the information noted above and/or other information. In other embodiments, the claimed and verified profile badge 514 may be a link to another page displaying relevant, detailed status information. In other embodiments, the claimed and verified profile badge 514 is not displayed. Advantageously, the claimed and verified profile badge 514 allows other users to adjust their trust level in the displayed profile based on whether the profile has been claimed by the associated user and/or verified as being associated with that user. For example, an unclaimed profile may not warrant the same level of trust in data accuracy as a profile that has been claimed and verified by the indicated user.

Also shown in user interface 500 is a profile photo 504 and an associated edit link. The user profile photo is a picture of the user associated with the user profile. In one embodiment, if a picture for the user is unavailable, the user profile photo will be blank, or a default picture may be displayed indicating that no picture is available for the user profile. The photo edit link is provided to allow the secondary user (or the primary user) to modify an existing profile photo or add a new user profile photo. In an embodiment, the user profile photo edit link is not provided. For example, the primary user may not want secondary users to edit their user profile photo. In this case, user profile photo edit link is not displayed to secondary users, but is displayed to the user when the user views their own profile.

The user interface 500 also contains other user profile data including an address, a telephone number, an employment, an email address, and user interests. In certain embodiments, other user profile data may be included. In user interface 500, each item of user profile data includes an associated confidence level (see, for example, address confidence level 508). The confidence level indicates a confidence or reliability associated with that particular data item, which may be based at least in part on a reliability index calculated for the particular item. A higher confidence score indicates that the profile data management system has determined the provided data is likely true and correct. A low confidence score indicates that the profile data management system has determined the provided data in not likely correct.

In the embodiment of FIG. 5A, a quantity of endorsements of particular data items is also indicated. Endorsements indicate the number of secondary users who have either submitted the same or similar user profile data, and/or have indicated an agreement with the provided data. The confidence level may also, at least in part, be based on the number of endorsements. Thus, more endorsements for a particular item of user profile data contributes to a higher confidence score, while fewer endorsements contribute to a lower confidence score. In an embodiment, the viewing user may click on the endorsements text to see a list of users who have endorsed and/or provided the particular item of user profile data. On the user interface 500, only reliable (in other words, high confidence level) user profile data is being displayed.

The lock icon 507 indicates that the primary user has set the privacy level associated with the telephone number to private (or to a level at which the current secondary user cannot view it). Additionally, the telephone number has been obscured. In an embodiment, one or the other of a lock icon or an obscured item of user profile data is displayed.

User profile data edit links 506 are also provided to allow a secondary user to add data or modify the displayed data. In an embodiment, the user profile data edit links may not be displayed. For example, if a user selects to prevent his data from being modified by a secondary user, then the user profile data edit links may not be displayed to a secondary user that accesses the user profile.

Figure 5B:
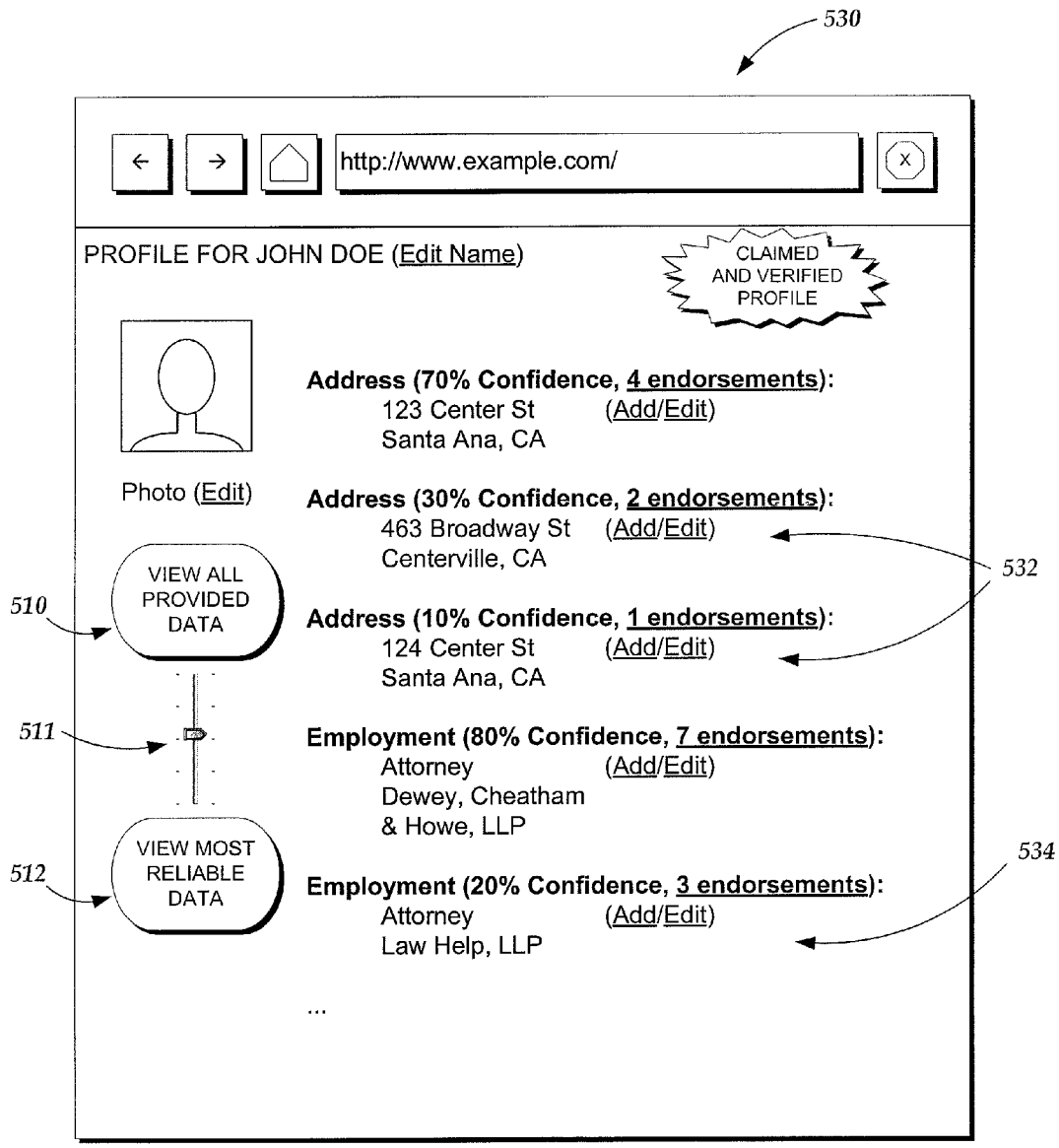
FIG. 5B is another illustrative user interface of the profile data management system in which a user profile is displayed, according to an embodiment of the present disclosure.

The user interface 500 also includes a user profile data display buttons 510 and 512. Button 510 may be selected by a user or a secondary user to view all data provided about the user. Such a display may include both reliable and unreliable data. FIG. 5B illustrates such a user interface display. Button 512 may be selected by a user or a secondary user to view only reliable data related to a user. In the user interface 500, only the most reliable data is being shown, such as in response to the user selecting the reliable data display button 512 or based on system or user preferences to display only reliable data. A slider 511 is additionally provided to enable the viewing user to fine tune the amount and/or degree of unreliable user profile data shown on the display.

The user interface 500 also illustrates user profile data that is not available to the secondary user, but may become available when the secondary user has enough credits, and/or reaches a certain membership level. As shown at 516, the user may choose to spend two credits to view the hidden email address. Meanwhile, the hidden interest data is not available to the particular secondary user, because the secondary user either has an insufficient number of credits, or in an alternative embodiment, is at a membership level too low to view interest data.

FIG. 5B is another illustrative user interface of the profile data management system in which a user profile is displayed, according to an embodiment of the present disclosure. A user interface 530 is shown in which less reliable user profile data is displayed. In user interface 530, the slider 511 is set halfway between viewing all provided data, and viewing the most reliable data. Thus, some, but not all unreliable user profile data is shown. In particular, less reliable addresses 532 are displayed. Addresses 532 have a lower confidence and reliability than the reliable address shown above them. Additionally, each has fewer endorsements from other users, contributing to the lower reliability determination. Similarly, lower reliability employment 534 is also shown.

Depending on the embodiment, data being displayed may be denoted as reliable or unreliable by modifying the displayed text in a variety of ways, such as highlighting, underlining, bolding, italicizing, color coding, or altering the text in some other manner. Additionally, buttons 510 and button 512 may be color-coded depending on which button is selected and what type of data is being displayed. Furthermore, the claimed and verified profile badge 514 may also be modified in the aforementioned ways (highlighting, color coding, underlining, etc.) based on the type of data (reliable provided data, or both reliable and unreliable provided data) that is being displayed.

In some embodiments, the data being displayed may be configured based on reliability or confidence levels. For example, a reliability threshold may be set (by a particular user, group of users, or the user profile system) such that only data exceeding the reliability threshold is displayed. Depending on the embodiment, a reliability threshold may be the same for each type of data associated with the user, or reliability thresholds may be separate for different types of data. For example, a reliability threshold for a previous employer may be lower than the reliability threshold for current contact data, such as a telephone number or email address.

In an embodiment, all provided data may be displayed, wherein the text of the data exceeding the reliability threshold may be altered in one of the aforementioned ways (color coding, highlighting, underlining, etc.) while the text not exceeding the reliability threshold is altered in a different manner or unaltered. The reliability threshold may be a number, a percentage, or some other cutoff used to measure the reliability of the user profile data in question.

In some embodiments, a secondary user may be able to provide other user inputs about the data displayed for a user profile. For example, a secondary user may provide comments, ratings, preferences, or other inputs about the displayed data for a user profile. These inputs may be stored as user profile data at the user profile data store 110, and may be retrieved for reliability index determinations, user profile display, or other purposes.

The user profile data that is displayed, modified, updated, and/or added may be stored in a number of ways. In one embodiment, the data is stored at the user profile data store 110. Alternatively, some of the data may be stored at the user profile data store 110, while the remainder of the data is stored at the user profile server 108.

Figure 6:
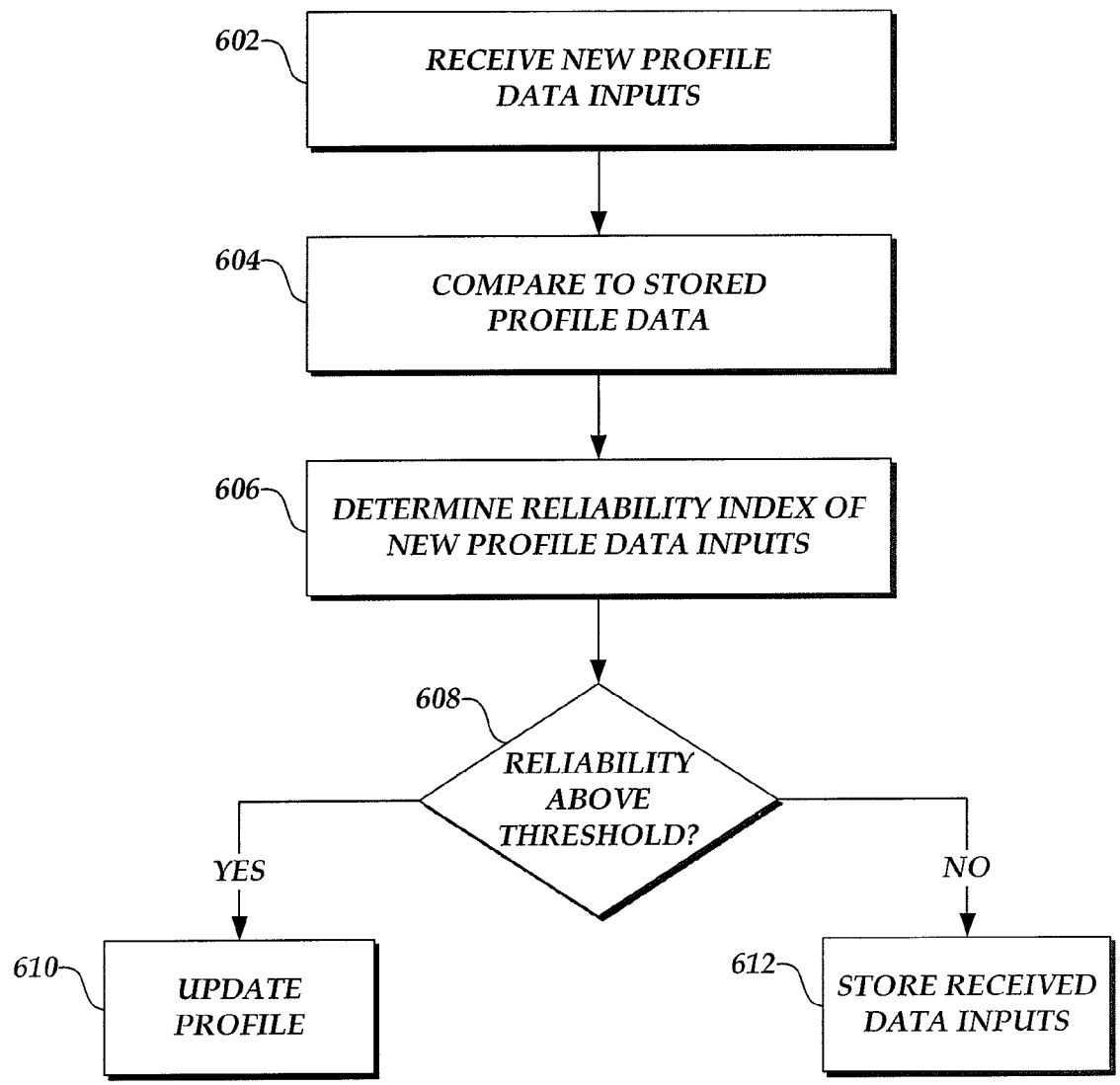
FIG. 6 is a flow diagram depicting an illustrative operation of the profile data management system in which data inputs are received, according to an embodiment of the present disclosure.

FIG. 6 is a flow diagram depicting an illustrative operation of the profile data management system in which data inputs are received, according to an embodiment of the present disclosure. In the embodiment of FIG. 6 described below, user profile data inputs are received from a secondary user and evaluated for their reliability. The user profile data inputs generally consist of updates and/or new data associated with a particular user profile (herein referred to the user profile to be updated). In certain embodiments, the process described in FIG. 6 may also apply to user profile data inputs that are received from a user to update the user's own profile. Depending on the embodiment, the method of FIG. 6 may include fewer or additional blocks and/or the blocks may be performed in an order different than illustrated.

At block 602, the user profile server 108 receives user profile data inputs about profile data from a secondary user. These inputs may be transferred from the secondary user computing device 104, through the network 106 as described above, and may include any of the types of user profile data descried above.

Next, at block 604, the received user profile data inputs are compared with stored user profile data associated with the user profile (of the primary user) to be updated. The comparison may be accomplished by the data modification module 214 and/or the reliability index determination module 216 as described above. In some embodiments, the received user profile data inputs are further compared to other received inputs (from, for example, other third parties, third-party data, and/or other data associated with the user profile to be updated). Such comparison may be used to determine the reliability of the inputs provided, as shown at block 606. In an embodiment, the comparison of block 604 is performed as a part of the reliability index determination of block 606, which is described next.

At block 606 the reliability index of the received user profile data inputs may be determined based on various factors described below with reference to FIG. 7. For example, the user profile server 108 may receive a user profile data input from a secondary user, as shown at block 602. The input from the secondary user may include, for example, the information that the user's age is 95 years old. The profile data management system may already have stored reliable data (stored in the user profile data store 110, for example) indicating the user's age is 45 years old. Thus, at blocks 604 and 606 the profile data management system compares the inputted age, 95 years old, to the stored data, 45 years old, and determines a reliability index associated with the inputted age data. In the current example, the input of 95 years old would likely be deemed unreliable because the input is different from the stored reliable data. Further, only one input indicates the age of the subject is 95 years old, whereas the stored user profile data indicating the subject is 45 years old may be based on multiple reliable inputs, thereby indicating the age of 45 years old is reliable. Because the inputted age of 95 years old is different from the stored reliable data of 45 years old, and because there is only one input stating the age is 95 years old, the input would likely be considered unreliable.

Once the reliability index is determined at block 606, the process continues to 608, where the calculated reliability index for the user profile data inputs is compared to a predetermined threshold. For example, in an embodiment, the reliability index of an input may be compared with the reliability threshold, wherein if the reliability index is greater than or equal to the reliability threshold, the input is deemed to have a "high enough reliability", and the process continues to block 610. Alternatively, if the reliability index is below the reliability threshold, the input does not have a "high enough reliability", and the process continues to block 612. In some embodiments, the reliability threshold may be set by the user of the profile data management system. In some embodiments, the reliability threshold may be set by one or more secondary users. In some embodiments, the reliability threshold may be set at a designated value by the profile data management system, and may be based on a variety of factors. For example, the reliability threshold may be based on the identity of the user, the identity of the user profile to be updated, the number of inputs per unit of time that the profile data management system is receiving, the number of inputs and/or the age of the user profile to be updated (for example, a profile that has existed for a long period of time may have a higher threshold than a new profile), and/or the identity of the secondary user, among others.

When the user profile data inputs are determined to be reliable, the process continues to block 610 at which point the user profile data inputs are used to update the user profile data of the user profile to be updated, and stored in the user profile data store 110. Otherwise, the process continues to block 612 at which point the user profile data inputs are stored in the user profile data store 110 and simply associated with the user profile. User profile data inputs stored in block 612 may be used in determining the reliability of future user profile data inputs, for example. Thus, in an embodiment, after completion of the process of FIG. 6, a secondary user viewing the updated profile may see the newly submitted data, depending on the determined reliability of the submitted data, and, for example, the position of the slider 511 of FIGS. 5A and 5B. In an embodiment, data stored by the profile data management system (as in block 612) may be displayed on a user profile when the slider 511 is set to a high enough level and/or the viewing user requests to view all provided data associated with the profile, including even data inputs that are considered unreliable.

For example, the profile data management system may have stored reliable data indicating the user's age is 45 years old. The reliability index of the stored data may be 90% (e.g., based on the same age input being provided by multiple secondary users and/or confirmed by third party records, such as public data). A secondary user may then provide an input that the subject's age is 50 years old. The profile data management system may compare this input to the stored data and determine the values are different. As a result, the profile data management system may assign this input a reliability index of, for example, 50%, because the provided input is significantly different than the stored, highly reliable data. In an instance in which the reliability threshold of the profile data management system is 30%, the provided input may be used to updated the profile data (block 610). However, in an instance in which the reliability threshold is 90%, the provided input may be stored, but not update the profile data (block 612).

Continuing the example, after storing the input as data in block 612, the profile data management system may receive, for example, ten additional inputs from ten other secondary users indicating the subject's age is 50 years old. Because each of the ten inputs provided similar data, the profile data management system may determine a higher reliability index for each of the inputs than was determined for the single input. As a result, the reliability index for these ten additional inputs (or a combined reliability index for multiple inputs indicating the same age) may gradually increase until the tenth additional input has a reliability index larger than, for example, 90%. As a result, the user profile data may be updated to reflect that the subject's age is 50 years old. In some embodiments, the data with the previous age of 45 years old is still stored in the profile data management system, and may be shown to a profile viewing user when, for example, the profile viewing user requests to view all data associated with a particular profile. In some embodiments, the data with the previous age of 45 years old may be deleted from the profile data management system.

In some embodiments, the profile data management system executes additional actions based on the reliability of the received inputs. For example, the profile data management system may alter and/or reduce the access rights of a secondary user who continuously provides unreliable data. Alternatively, the profile data management system may alter the user profile of the secondary user based on the reliability of the input received from secondary user. For example, a rogue secondary user may be continuously providing incorrect inputs about a subject's age. In this case, the profile data management system may revoke the rogue secondary user's access rights to providing inputs on the subject's age, thus preventing further incorrect inputs from being made. Further, the profile data management system may modify the user profile of the rogue secondary user to reflect that the rogue secondary user is not a credible source. This change to the user profile of the rogue secondary user may cause the reliability index of their subsequent inputs to be lowered.

Figure 7:
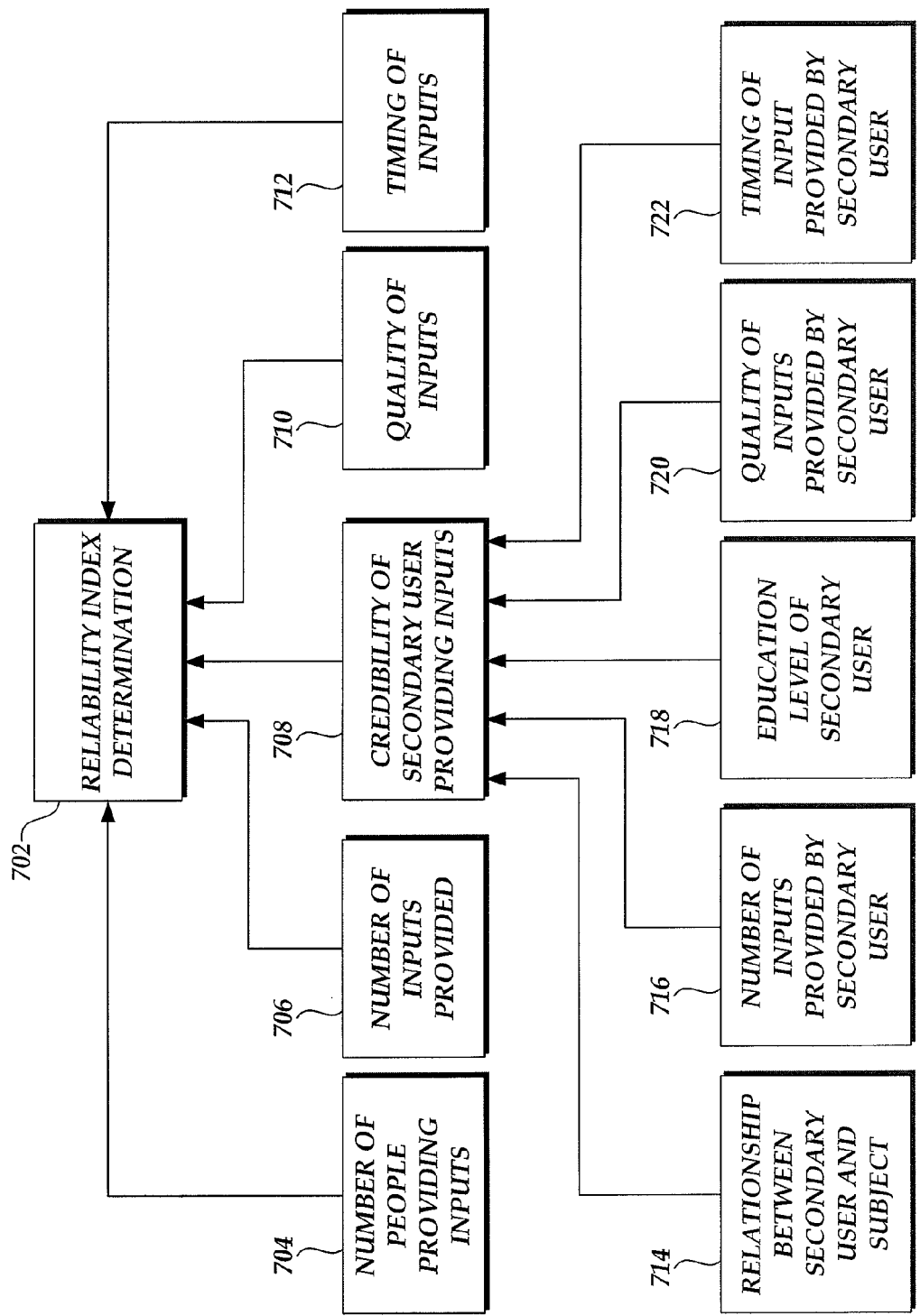
FIG. 7 is a block diagram depicting illustrative factors that may be considered by the profile data management system in determining a reliability index, according to an embodiment of the present disclosure.

FIG. 7 is a block diagram depicting illustrative factors that may be considered by the profile data management system in determining a reliability index, according to an embodiment of the present disclosure. The reliability index of received inputs (for example, an individual input item, such as an email address, or multiple input items, such as all inputs received from a particular individual), shown at block 702, may depend on a number of factors. These factors may include the number of people providing inputs about the data 704, the number of inputs that have been provided concerning the particular type of user profile data 706, the credibility of the secondary user who provided inputs about the user 708, the quality of the inputs 710, and/or the timing of when the inputs are provided 712. In other embodiments, other factors can also affect the reliability index of received inputs. In an embodiment, the reliability index is calculated based on a formula including weighted contributions from each of the described factors, among others.

Various other factors may affect the credibility of the secondary user providing the inputs (block 708). These factors include the relationship between the secondary user and the subject user 714, the number of inputs the secondary user has provided 716, the education level of the secondary user 718, the quality of the current and previous inputs provided by the secondary user 720, and/or the timing of the current and previous inputs provided by the secondary user 722. In other embodiments, other factors can also affect the credibility of the secondary user.

For example, the profile data management system may determine the age of the user, and/or whether the age of the user should be updated, based on one or more inputs provided by secondary users. The profile data management system may analyze inputs provided by various secondary users. One factor that may affect the reliability of an inputted age may be the number of people inputting the age, as shown at block 704. For example, if 30 secondary users input that the subject is 45 years old, while seven secondary users input the subject's age as 46 years old, the subject being 45 years old may be deemed more reliable by the profile data management system due to the larger number of people providing inputs, as shown at block 704.

In another example, if the profile data management system may receive seven inputs from multiple individuals stating the subject user is 45 years old, compared to one input from another individual stating the subject user is 46 years old. In this example, the 45 year old input may be deemed more reliable due to the larger number of inputs, as shown at block 706.

In another example, if the profile data management system may receive an input stating the subject is 45 years old, and another input stating the subject is 450 years old, the subject being 45 years old may be determined to be more reliable due to the quality of the inputs, as shown at block 710.

In another example, if the profile data management system may have received an input stating the subject is 45 years old two days ago compared to a different input stating the subject is 44 years old two months ago, the subject being 45 years old may be determined to be more reliable due to the timing of when the input was provided, as shown at block 712.

In another example, if the profile data management system may receive an input stating the subject is 45 years old from a first secondary user who is highly credible, while also receiving a different input stating the subject is 44 years old from a second secondary user who is not very credible. In this example, the subject being 45 years old may be determined to be more reliable due to the higher credibility of the secondary user, as shown at block 708. In this example, the credibility of the secondary user can be determined based on several factors. For example, if the first secondary user was the spouse of the subject, while the second secondary user was a stranger, the first secondary user would have a higher credibility due to the relationship between the secondary user and subject, as shown at block 714. Alternatively, if the first secondary user has a long history of providing reliable inputs, whereas the second secondary user had only made one input about the subject user, the first secondary user may be deemed more credible due to the larger number of reliable inputs made, as shown at blocks 716 and 720.

Figure 8:
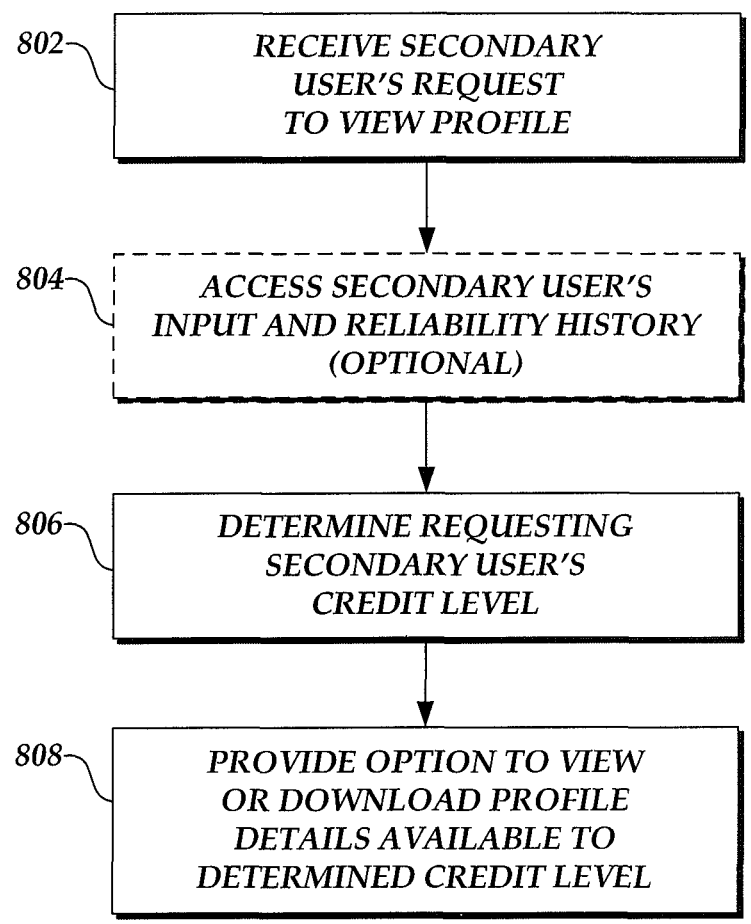
FIG. 8 is a flow diagram depicting an illustrative operation of the profile data management system in which a profile is viewed, according to an embodiment of the present disclosure.

FIG. 8 is a flow diagram depicting an illustrative operation of the profile data management system in which a profile is viewed, according to an embodiment of the present disclosure. As described above with reference to indication 516 of FIG. 5A, certain items on user profiles of the profile data management system may only be viewable to users which have earned enough credits and/or have a certain membership or credit level. In an embodiment, credit and/or membership levels may be earned and/or attained as the user provides user profile data inputs. This will be described further in reference to FIG. 9.

Figure 9:
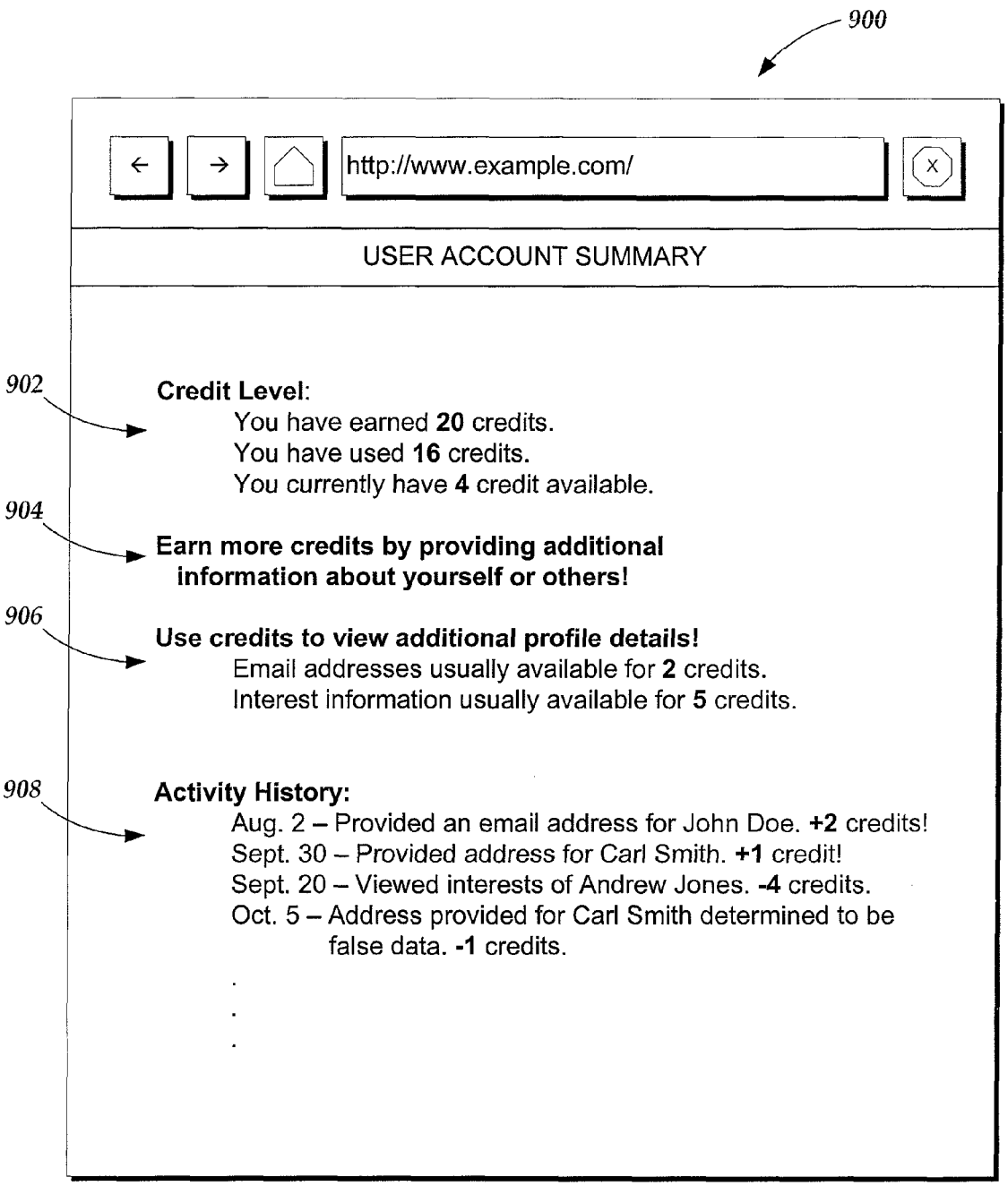
FIG. 9 is an illustrative user interface of the profile data management system in which a user account summary is displayed, according to an embodiment of the present disclosure.

FIG. 9 is an illustrative user interface of the profile data management system in which a user account summary is displayed, according to an embodiment of the present disclosure. In user interface 900, the account summary of the user is shown. At 902, the current credit level of the user is displayed. This particular user of the profile data management system has earned 20 credits, but has spent 16 of them, and now has 4 credits available. At 904, the user interface 900 indicates that the user may earn additional credits by providing additional user profile data inputs about themselves and/or others. At 906, the credit costs associated with viewing various additional profile details associated with other users are shown. In the example user interface 900, email addresses of other users are available for 2 credits, while interest information is available for 5 credits. Additionally, at 908 the user's activity history is provided. In an embodiment, the user's activity history includes any user profile data the user has submitted including associated reliability determinations, and/or any user profile data requests the user has made. Credits are earned by the user when good, reliable data is provided, while credits are lost when unreliable data is provided. Credits are also spent by the user to view user profile data that may be hidden by default.

Turning again to FIG. 8, at block 802 a request is received from a secondary user to view a primary user profile. Such requests may be received substantially as described in reference to 1 of FIG. 3B.

At optional block 804, the profile data management system may access the secondary user's input and reliability history. The user's input and reliability history may include data similar to the items displayed in the user's activity history 908 of FIG. 9, in addition to other data. Also, the user's input and reliability history may be stored in the user profile data store 110, and accessed by the user profile server 108.

At block 806, the profile data management system determines the requesting user's current credit level based on the user's input and reliability history. In an embodiment, block 804 may not be performed, but a running total of the user's credit level may be kept by the profile data management system. Determining the user's current credit level may, in general, be accomplished by the user profile server 108.

Next, at block 808, the profile data management system may provide to the user the option of view or download profile details available to the user at the determined credit level. For example, at block 808 the user may view the profile user interface 500 (of FIG. 5A) and/or the profile user interface 530 (of FIG. 5B). Certain items of user profile data may or may not be viewable by the user based on the user's current credit level. In an embodiment, a membership level is determined as opposed to (or in addition to) a credit level. In an embodiment, the user may have the option of downloading user profile data rather than just viewing user profile data. In an embodiment, the user may be provided with the option to bulk downloading user profile data associated with many users simultaneously.

In an embodiment, the profile data management system may determine whether or not user profile data provided by a user is false or fraudulent. For example, a fraudulent determination may be made at the same time the reliability index is calculated, and may be accomplished by the reliability index determination module 216. Such a determination may happen real-time, much like the reliability index determination may be accomplished real-time by the profile data management system. Alternatively, fraudulent user profile data may be detected after an initial determination index is calculated. A fraudulent user profile data determination may be based on, for example, data provided my other users of the profile data management system and/or other fraud detection processes. In the user interface 900 of FIG. 9, the list entry of the user's activity history 908 indicates that the user provided a fraudulent or false address for another user of the profile data management system. Thus, in the embodiment of FIG. 9, the user was penalized by losing a credit. In an embodiment, users of the profile data management system engaged in fraudulent activity may be banned from the profile data management system.

Depending on the embodiment, the methods and processes described with reference to the flow diagrams of FIGS. 6, 7, and 8 as well as any other methods and/or processes discussed herein, may include fewer or additional blocks, and/or the blocks may be performed in a different order than is illustrated. Software code configured for execution on a computing device in order to perform the methods may be provided on a computer readable medium, such as a compact disc, digital video disc, flash drive, hard drive, memory device or any other tangible medium. Such software code may be stored, partially or fully, on a memory of a computing device, such as the user profile system, and/or other computing devices illustrated in the figures, in order to perform the respective methods.

The profile data management system thus advantageously provides a central repository for data and information associated with a user. The information may be presented through an electronic user interface as a profile of the user, accessible to many individuals simultaneously. The profile data management system maintains profiles for many users and enables users and/or secondary users to submit information and to modify the user profiles, thus keeping the user profile data up to date through crowdsourcing. The crowdsourcing profiles model of the profile data management system allows secondary users to provide updates, modifications, comments, ratings, preferences, and/or other inputs to the profile data management system. Crowdsourcing profiles may advantageously reduce redundant profile management efforts by generating and/or updating profile data based on data that is reported as reliable by one or more users.

Additionally, in some embodiments, a user may advantageously gain access to initially provided and/or automatically gathered data by authenticating themselves with the profile data management system. Once authenticated, the data drawn from a variety of sources, and/or others who have information about the user, may be used to populate the user's profile. Also, advantageously the profile data management system provides a model for earning and spending credits for access to additional user profile data. This model provides an additional incentive for users of the profile data management system to provide reliable user profile data, and keeps users engaged with the system.

Depending on the embodiment, certain acts, events, or functions of any of the processes or algorithms described herein may be performed in a different sequence, may be added, may be merged, and/or may be left out altogether (for example, not all described operations or events are necessary for the practice of the process or algorithm). Moreover, in certain embodiments, operations or events may be performed concurrently, for example, through multi-threaded processing, interrupt processing, or multiple processors or processor cores or on other parallel architectures, rather than sequentially.

The various illustrative logical blocks, modules, routines, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the disclosure.

The steps of a method, process, routine, or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of a non-transitory computer-readable storage medium. An example storage medium may be coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method of managing user profile data in a crowd-sourced electronic environment, the method comprising:
  as implemented by one or more computer systems comprising computer hardware and memory, the one or more computer systems configured with specific executable instructions,
    storing a plurality of profile data items associated with a primary user in an electronic data store accessible over a computer network;
    providing an electronic user profile to a plurality of secondary users, wherein the electronic user profile is provided over the computer network, and wherein the electronic user profile is populated with at least portions of the profile data items associated with the primary user and stored in the electronic data store;
    receiving an update to a first data item of the electronic user profile from a secondary user;
    analyzing the updated first data item and/or information associated with the secondary user to determine a reliability of updated first data item; and updating, in the electronic data store, the profile data associated with the primary user to include the determined reliability of updated first data item, wherein the updated first data item is provided for display to respective users based on a relationship between the determined reliability and a predetermined reliability threshold.

2. The computer-implemented method of claim 1, wherein said profile data items include one or more of: a name, a logo, a slogan, an e-mail address, an address, an age, a telephone number, a gender, a height, a weight, a physical characteristic, education data, vehicle(s) owned data, a residence, hobby data, interest data, an award, achievement data, a publication, a philanthropic endeavor, a political affiliation, a religious affiliation, a language, a professional skill, a marriage status, employment data, financial net worth data, criminal history data, or personal information.

3. The computer-implemented method of claim 1, wherein said reliability of the updated first data item is based on one or more of a relationship between the secondary user and the primary user, a number of updates provided by the secondary user, an education level of the secondary user, a quality of updates provided by the secondary user, a timing of the update received from the secondary user, a credibility of the secondary user, a number of other secondary users having provided a similar update.

4. The computer-implemented method of claim 1, further comprising:
as further implemented by the one or more computer systems,
in response to determining that the updated data item has a reliability that is above the predetermined reliability threshold, displaying the electronic user profile, including the updated data item, on a display device of another secondary user.

5. The computer-implemented method of claim 4, wherein the electronic user profile further includes, for individual profile data items displayed, an endorsement indicator indicating a number of secondary users providing updates similar to the profile data item.

6. The computer-implemented method of claim 1, further comprising:
as further implemented by the one or more computer systems,
in response to input from another secondary user requesting display of all profile data regardless of the reliability of the data items, displaying the electronic user profile, including the updated data item regardless of the reliability of the updated data item, on a display device of the another secondary user.

7. The computer-implemented method of claim 1, further comprising:
as further implemented by the one or more computer systems,
receiving a request from another secondary user to access the electronic user profile;
determining the identity of the requesting another secondary user;
determining a credit level associated with the another secondary user; and
providing access to at least a portion of the electronic user profile to the another secondary user, wherein access is provided based at least in part on at least one of the identity of the another secondary user and a credit level associated with the another secondary user.

8. The computer-implemented method of claim 7, wherein providing access comprises at least one of displaying the electronic user profile on a display device and transmitting profile data to a receiving electronic device.

9. The computer-implemented method of claim 7, wherein the credit level associated with the another secondary user is based at least in part on at least one of a history of electronic profile updates provided by the another secondary user, reliability scores associated with electronic profile updates provided by the another secondary user, and credit payments received from the another secondary user.

10. A computer system comprising:
one or more hardware processors in communication with a computer readable medium storing software modules including instructions that are executable by the one or more hardware processors, the software modules including at least:
a user interface module configured to access user profile data from an electronic data store in response to a request from a requestor for said user profile data, wherein said user interface module identifies said requestor and provides at least a portion of said user profile data to said requestor based on the identity of said requestor;
a data modification module configured to receive one or more updates to the user profile data from said requestor; and
a reliability index determination module configured to determine a reliability index associated with each of the received one or more updates,
wherein said data modification module stores said one or more updates and respective determined reliability indices to said electronic data store.

11. The computer system of claim 10, wherein providing at least of portion of said user profile data comprises at least one of displaying the user profile data on a display device and transmitting the user profile data to a receiving electronic device,
wherein the portion of the user profile data provided is based at least in part on a relationship between associated determined reliability indices and a predetermined reliability threshold.

12. The computer system of claim 10, wherein said one or more updates to the user profile data comprise at least one of a name, a logo, a slogan, an e-mail address, an address, a age, a telephone number, a gender, a height, a weight, a physical characteristic, education data, vehicle(s) owned data, a residence, hobby data, interest data, an award, achievement data, a publication, a philanthropic endeavor, a political affiliation, a religious affiliation, a language, a professional skill, a marriage status, employment data, financial net worth data, criminal history data, and personal information.

13. The computer system of claim 10, wherein said reliability index is determined based on at least one of a number of updates provided by the requestor, an educations level of the requestor, a quality of updates provided by the requestor, a timing of the one or more updates received from the requestor, a credibility of the requestor, a number of other requestor having provided a similar update.

14. Non-transitory computer storage having stored thereon a computer program that instructs a computer system to manage user profile data by at least:
storing profile data associated with a primary user in an electronic data store accessible over a computer network;
providing an electronic user profile to a plurality of secondary users, wherein the electronic user profile is provided over the computer network, and wherein the electronic user profile is populated with at least portions of the profile data associated the primary user and stored in the electronic data store;

receiving one or more updates to the electronic user profile, each update provided by one of the plurality of secondary users;

analyzing the one or more updates received from the plurality of secondary users to determine a reliability of each of the one or more updates; and updating, in the electronic data store, the profile data associated with the primary user to include updates to reliability indices of respective profile data items in view of the determined reliabilities of the profile data items.

15. The non-transitory computer storage of claim 14, further including:

displaying the electronic user profile on a display device, wherein the displayed profile data is selected based at least in part on respective determined reliabilities.

16. The non-transitory computer storage of claim 15, wherein the displayed profiles data includes items having an associated reliability above a predetermined threshold.

17. The non-transitory computer storage of claim 15, wherein the displayed profiles data includes items having an associated reliability below a predetermined threshold.

18. The non-transitory computer storage of claim 14, further including:

receiving a request from one of the plurality of secondary users to access the electronic user profile;

determining the identity of the requesting secondary user;

determining a credit level associated with the identified requesting secondary user; and providing access to at least a portion of the electronic user profile to the identified requesting secondary user, wherein access is provided based at least in part on at least one of the identity of the requesting secondary user and the credit level associated with the requesting secondary user.

19. The non-transitory computer storage of claim 18, wherein providing access comprises at least one of displaying the electronic user profile on a display device and transmitting the electronic user profile data to a receiving electronic device.

* * * * *

UNITED STATES PATENT AND TRADEMARK OFFICE
CERTIFICATE OF CORRECTION

PATENT NO. : 8,972,400 B1
APPLICATION NO. : 13/794459
DATED : March 3, 2015
INVENTOR(S) : Mark Joseph Kapczynski It is certified that error appears in the above-identified patent and that said Letters Patent is hereby corrected as shown below:

Specification

In column 5 at line 21, Change "associated the" to --associated with the--.

In column 6 at line 55, Change "and or" to --and/or--.

In column 14 at line 3, Change "and or" to --and/or--.

In column 18 at line 17, Change "descried" to --described--.

Claims

In column 27 at line 3, In Claim 14, change "associated the" to --associated with the--.

Signed and Sealed this
Nineteenth Day of January, 2016

Michelle K. Lee
*Director of the United States Patent and Trademark Office*